(12) United States Patent
Ito et al.

(10) Patent No.: US 8,097,994 B2
(45) Date of Patent: Jan. 17, 2012

(54) COOLING STRUCTURE FOR A VEHICLE AC GENERATOR

(75) Inventors: Shinichi Ito, Chiyoda-ku (JP); Shinji Nishimura, Chiyoda-ku (JP); Yoshiro Imazawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 12/601,769

(22) PCT Filed: Aug. 30, 2007

(86) PCT No.: PCT/JP2007/066865
§ 371 (c)(1),
(2), (4) Date: Nov. 24, 2009

(87) PCT Pub. No.: WO2009/028066
PCT Pub. Date: Mar. 5, 2009

(65) Prior Publication Data
US 2010/0171379 A1    Jul. 8, 2010

(51) Int. Cl.
*H02K 21/12* (2006.01)
*H02K 9/00* (2006.01)

(52) U.S. Cl. ......... 310/156.66; 310/62; 310/63; 310/89; 310/156.69; 310/156.71

(58) Field of Classification Search ............. 310/156.66, 310/156.69, 156.71, 62, 63, 89
See application file for complete search history.

(56) References Cited

U.S. PATENT DOCUMENTS

| 4,492,885 | A |   | 1/1985 | Kitamura et al. |
|---|---|---|---|---|
| 5,751,079 | A | * | 5/1998 | Bagherpour et al. .......... 310/59 |
| 7,129,614 | B2 |   | 10/2006 | Hahn et al. |
| 2007/0063593 | A1 | * | 3/2007 | Braun et al. .................... 310/58 |

FOREIGN PATENT DOCUMENTS

| JP | 57-159367 A | 10/1982 |
|---|---|---|
| JP | 5-43766 U | 6/1993 |
| JP | 09-107650 A | 4/1997 |
| JP | 10-136612 A | 5/1998 |
| WO | WO 2005064772 A1 * | 7/2005 |
| WO | 2005/093929 A1 | 10/2005 |

* cited by examiner

*Primary Examiner* — Quyen Leung
*Assistant Examiner* — Jose Gonzalez Quinones
(74) *Attorney, Agent, or Firm* — Sughrue Mion, PLLC

(57) ABSTRACT

There is provided a vehicle AC generator in which the contact face of at least one of a pair of cases that make contact with the respective axis-direction end faces of a stator core is provided with a cooling air path that connects the outer circumferential surface of a coil end portion with the outer circumferential surface of the stator core and has an opening in the axis direction at the outer circumferential surface of the stator core so that the coolability of the coil end portions of the stator coil is raised, and the amount of cooling air is increased so that the overall coolability of the AC generator is improved.

19 Claims, 16 Drawing Sheets

US 8,097,994 B2

COOLING STRUCTURE FOR A VEHICLE AC GENERATOR

TECHNICAL FIELD

The present invention relates to a vehicle AC generator mounted in a vehicle such as an automobile and particularly to the improvement of the cooling structure therefor.

BACKGROUND ART

In a conventional vehicle AC generator, the coil end portions of a stator coil are cooled with cooling air produced through the rotations of cooling fans fixed on a rotor (for example, refer to Patent Document 1). That is to say, as illustrated in FIG. 23, a pair of cooling fans 21 and 22 fixed to the respective axis-direction end portions of a rotor 1 fixed on a rotor shaft 11 rotates integrally with the rotor 1, so that cooling air A and cooling air B flow into a pair of cases 31 and 32 through air inlets 314 and 324, respectively, provided in the cases 31 and 32.

The directions of the cooling air A and the cooling air B that have flown into the cases 31 and 32 are bent from the axis direction to the radial direction by the centrifugal force produced by the rotations of the cooling fans 21 and 22; then, the cooling air A and the cooling air B flow along axis-direction end faces 411 and 421 of coil end portions 41 and 42 of a stator coil 40 and are discharged through air outlets 315 and 325, respectively, provided in the cases 31 and 32. The axis-direction end face 411 of the coil end portion 41 is cooled through heat exchange thereof with the cooling air A; the axis-direction end face 421 of the coil end portion 42 is cooled through heat exchange thereof with the cooling air B.

[Patent Document 1] National Publication of International Patent Application No. WO2005/093929A1

DISCLOSURE OF THE INVENTION

Problem(s) to be Solved by the Invention

In the conventional vehicle AC generator configured in such a way as described above, the coil end portions 41 and 42 of the stator coil 40 are cooled through heat exchange thereof with the cooling air A and the cooling air B that are discharged in the radial direction from the cooling fans 21 and 22. However, because the coil end portions 41 and 42 of the stator coil 40 are arranged in such a way as to extend in the axis direction from the respective axis-direction end faces of a stator core 5 and to be perpendicular to the cooling Air A and the cooling air B that flow in the radial direction of the stator core 5, the portions where the cooling air A and the cooling air B exchange heat with the coil end portions 41 and 42, respectively, are limited to the axis-direction end faces 411 and 421 of the coil end portions 41 and 42. Accordingly, there has been a problem that, in the conventional vehicle AC generator, the cooling of the coil end portions 41 and 42 is insufficient.

The present invention has been implemented in order to solve the foregoing problem in a conventional vehicle AC generator; the objective thereof is to provide a vehicle AC generator in which the coolability of the coil end portions of a stator coil is raised, and the amount of cooling air is increased so that the overall coolability of the AC generator is improved.

Means for Solving the Problem(s)

A vehicle AC generator according to the present invention includes a stator core having a plurality of slots on the inner circumferential portion thereof; a pair of cases, one of which is disposed at one axis-direction end portion of the stator core and the other one of which is disposed at the other axis-direction end portion and that have respective contact faces that make contact with the corresponding axis-direction end faces of the stator core, at least one of the cases in the pair having an air inlet for taking in cooling air that enters the case and an air outlet for discharging the cooling air to the outside of the case; a plurality of through-bolts that fix the pair of cases integrally with the stator core and extend in the axis direction of the stator core on the outer circumferential surface of the stator core; a stator coil that is mounted in the plurality of slots and has coil end portions, one of which protrudes in the axis direction from the one axis-direction end portion of the stator core and the other one of which protrudes in the axis direction from the other axis-direction end portion; a rotor shaft pivotably supported by the pair of cases; a rotor that is fixed on the rotor shaft and disposed in an inner space of the stator core; and one or more cooling fans fixed on at least one axis-direction end portion of the rotor. In the vehicle AC generator, the contact face of at least one of the pair of cases is provided with a cooling air path that connects the outer circumferential surface of the coil end portion with the outer circumferential surface of the stator core and has an opening in the axis direction of the stator core at the outer circumferential surface of the stator core.

Moreover, a vehicle AC generator according to the present invention includes a stator core having a plurality of slots on the inner circumferential portion thereof; a pair of cases, one of which is disposed at one axis-direction end portion of the stator core and the other one of which is disposed at the other axis-direction end portion and that have respective contact faces that make contact with the corresponding axis-direction end faces of the stator core, at least one of the cases in the pair having an air inlet for taking in cooling air that enters the case and an air outlet for discharging the cooling air to the outside of the case; a plurality of through-bolts that fix the pair of cases integrally with the stator core and extend in the axis direction of the stator core on the outer circumferential surface of the stator core; a stator coil that is mounted in the plurality of slots and has coil end portions, one of which protrudes in the axis direction from the one axis-direction end portion of the stator core and the other one of which protrudes in the axis direction from the other axis-direction end portion; a rotor shaft pivotably supported by the pair of cases; a rotor that is fixed on the rotor shaft and disposed in an inner space of the stator core; and one or more cooling fans fixed on at least one axis-direction end portion of the rotor. In the vehicle AC generator, the contact face of at least one of the pair of cases is provided with a cooling air path that connects the outer circumferential surface of the coil end portion with the outer circumferential surface of the stator core and has an opening in the radial direction of the stator core at the outer circumferential surface of the stator core.

Advantage of the Invention

In a vehicle AC generator according to the present invention, the contact face of at least one of a pair of cases is provided with a cooling air path that connects the outer circumferential surface of a coil end portion with the outer circumferential surface of the stator core and has an opening in the axis direction of the stator core at the outer circumferential surface of the stator core; therefore, cooling air passes along the outer circumferential surface of the coil end portion and then flows along the outer circumferential surface of the stator core through the cooling air path, whereby the coolability of the coil end portions of the stator coil is raised, and the amount of cooling air is increased so that the overall coolability of the AC generator can be improved.

Moreover, in a vehicle AC generator according to the present invention, the contact face of at least one of a pair of cases is provided with a cooling air path that connects the outer circumferential surface of a coil end portion with the outer circumferential surface of the stator core and has an opening in the radial direction of the stator core at the outer circumferential surface of the stator core; therefore, cooling air passes along the outer circumferential surface of the coil end portion and then is discharged to the outside of the case through the cooling air path, whereby the coolability of the coil end portions of the stator coil is raised, and the amount of cooling air is further increased so that the overall coolability of the AC generator can further be improved.

BEST MODE FOR CARRYING OUT THE INVENTION

Embodiment 1

Figure 1:
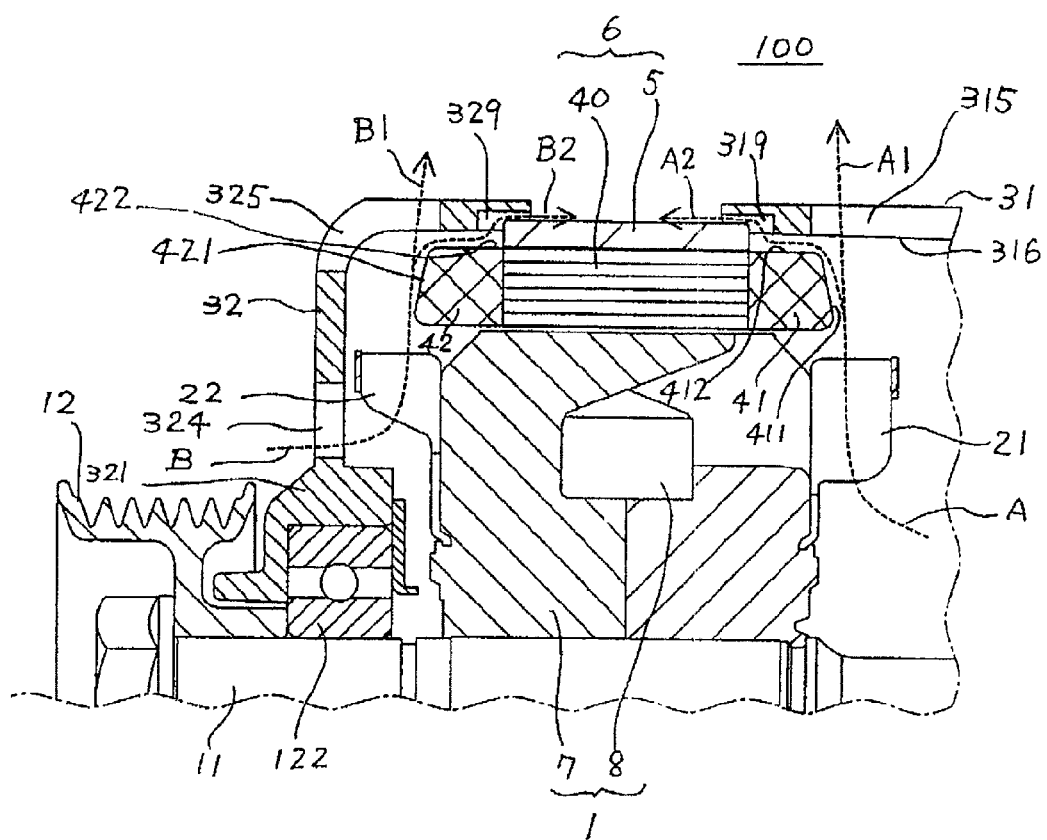
FIG. 1 is a cross-sectional view of principal parts of a vehicle AC generator according to Embodiment 1 of the present invention.

FIG. 1 is a cross-sectional view illustrating principal parts of a vehicle AC generator according to the present invention. In FIG. 1, a vehicle AC generator 100 is provided with a pair of cases 31 and 32, a rotor shaft 11 pivotably supported by the pair of cases 31 and 32 through a bearing 122, a claw-pole magnetic pole 7 (referred to simply as a magnetic pole, hereinafter) fixed to the rotor shaft 11, a magnetic-field coil 8 held by the magnetic pole 7, and cooling fans 21 and 22 fixed on the respective axis-direction end portions of the magnetic pole 7. A rotor 1 is configured with the rotor shaft 11, the magnetic pole 7, and the magnetic-field coil 8. At one end of the rotor shaft 11, there is fixed a pulley 12 that is coupled with the output shaft of an internal combustion engine (unillustrated) by the intermediary of a driving power transfer means (unillustrated) such as a belt.

The vehicle AC generator 100 is provided with a stator core 5 that is flanked with the pair of cases 31 and 32 at both axis-direction end faces thereof and a stator coil 40 mounted in a plurality of slots provided on the inner circumferential portion of the stator core 5. The stator coil 40 is formed of a plurality of coil conductors that are arranged in the depth direction of the slots and provided with coil end portions 41 and 42 that protrude in the axis direction from the respective axis-direction end faces of the stator core 5. A stator 6 is configured with the stator core 5 and the stator coil 40.

Figure 2:
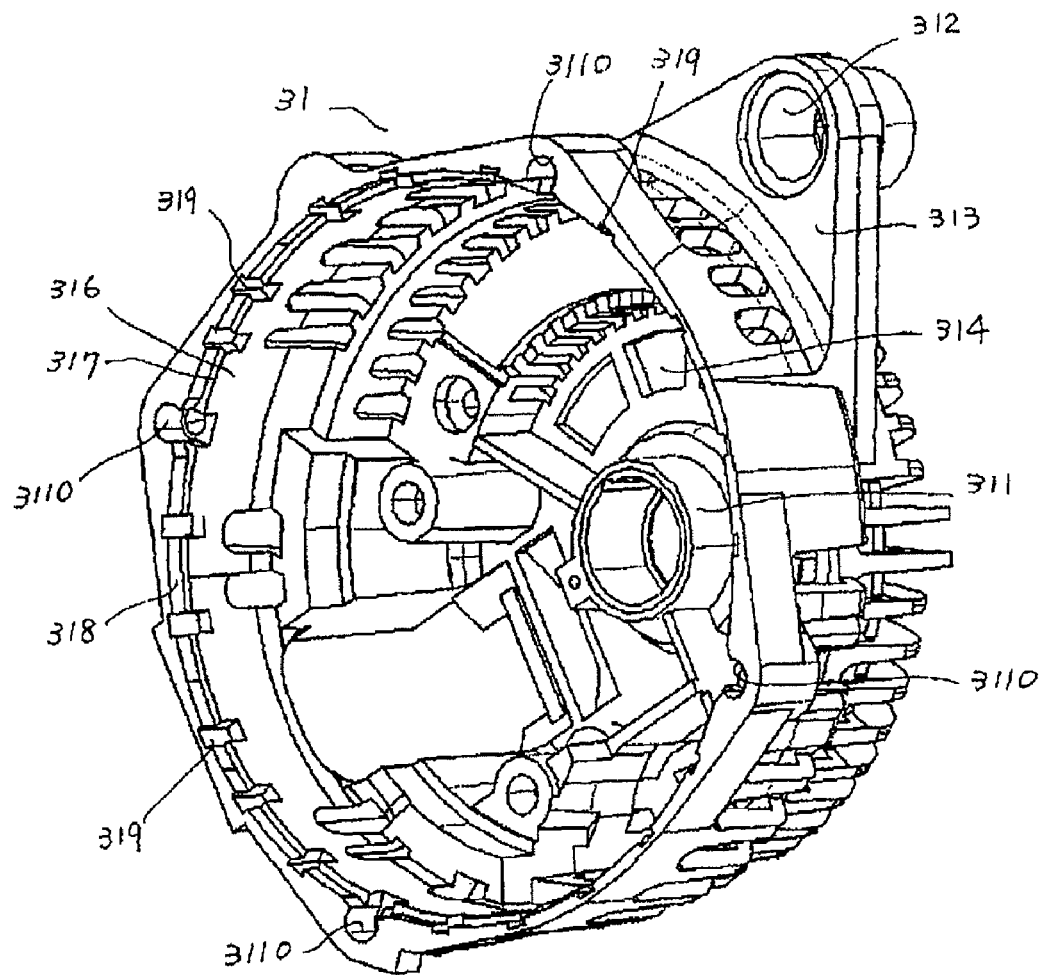
FIG. 2 is a perspective view illustrating the case of a vehicle AC generator according to Embodiment 1 of the present invention.
Figure 23:
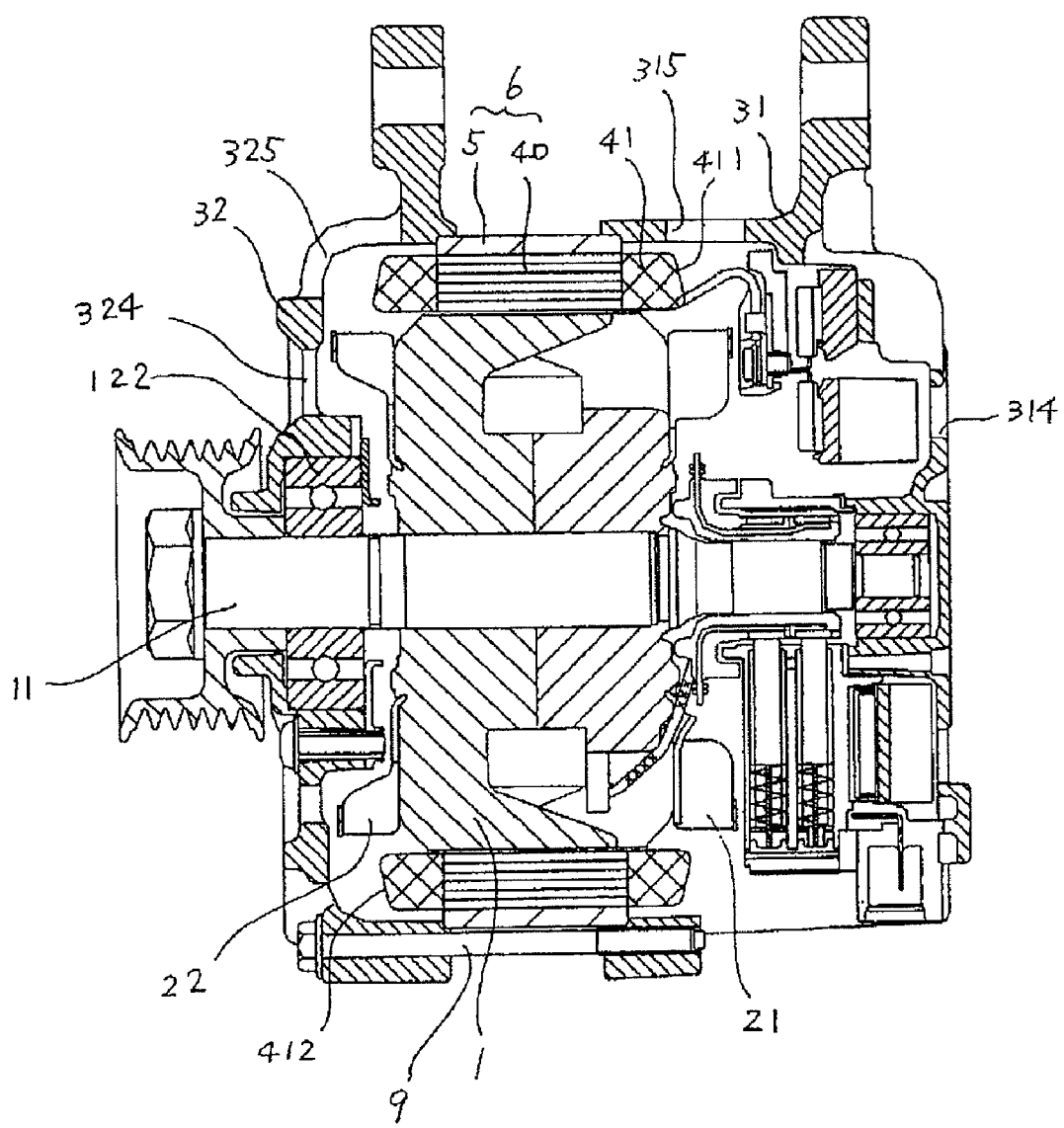
FIG. 23 is a cross-sectional view of a conventional vehicle AC generator.

FIG. 2 is a perspective view illustrating the case 31, out of the pair of cases, which is placed at a position that is more distal from the pulley 12 than the case 32. In FIGS. 1 and 2, the case 31 is provided with a bearing fixing portion 311 for fixing a bearing 121 (refer to FIG. 23) and a fixing member 313 having a through-hole 312 into which there is inserted a fixing bolt (unillustrated) for fixing the vehicle AC generator 100 to a structural member (unillustrated) of a vehicle. At the axis-direction end face of the case 31, there is formed a plurality of air inlets 314 each having an opening that faces the cooling fan 21, and at the outer circumferential surface, there is formed a plurality of air outlets 315 each having an opening in the radial direction.

On an inner circumferential surface 316 of the case 31, there are formed axis-direction contact faces 317 and radial-direction contact faces 318. The case 31 is mounted on one axis-direction end face, of the stator core 5, which is more distal from the pulley than the other end face, in such a way that the axis-direction contact faces 317 make contact with the peripheral portion of the axis-direction end face of the stator core 5, and the radial-direction contact faces 318 make contact with axis-direction end portion of the outer circumferential surface of the stator core 5.

On the axis-direction contact faces 317 and the radial-direction contact faces 318 formed on the inner circumferential surface 316 of the case 31, a plurality of cooling air paths 319 each formed of a U-shaped groove are arranged in the circumferential direction in such a way as to be spaced several pieces apart from one another; due to the plurality of cooling air paths 319, the contact between the axis-direction contact faces 317 and the axis-direction end face of the stator core 5 and the contact between the radial-direction contact faces 318 and the outer circumferential surface of the stator core 5 are continual. Each of the cooling air paths 319 faces, in the case 31, an outer circumferential surface 412 of the coil end portion 41 of the stator coil 40 and opens inward in the radial direction of the case 31; and at the outer circumferential surface of the stator core 5, each of the cooling air paths 319 opens in the axis direction of the stator core 5.

As is the case with the case 31, the case 32 situated in the vicinity of the pulley 12 is provided with a bearing fixing portion 321 for fixing the bearing 122 and a fixing member (unillustrated) having a through-hole into which there is inserted a fixing bolt for fixing the vehicle AC generator 100 to a structural member of a vehicle. At the axis-direction end face of the case 32, there is formed a plurality of air inlets 324 each having an opening that faces the cooling fan 22, and there is formed a plurality of air outlets 325 each having an opening that ranging from the axis-direction end face to the outer circumferential surface.

As is the case with the case 31, on an inner circumferential surface 326 of the case 32, there are formed axis-direction contact faces and radial-direction contact faces. The case 32 is mounted on one axis-direction end face, of the stator core 5, which is more proximal from the pulley than the other end face, in such a way that the axis-direction contact faces make contact with the peripheral portion of the axis-direction end face of the stator core 5, and the radial-direction contact faces make contact with axis-direction end portion of the outer circumferential surface of the stator core 5.

On the axis-direction contact faces and the radial-direction contact faces formed on the inner circumferential surface 326 of the case 32, a plurality of cooling air paths 319 each formed of a U-shaped groove are arranged in the circumferential direction in such a way as to be spaced apart from one another; due to the plurality of cooling air paths 329, the contact between the axis-direction contact faces and the axis-direction end face of the stator core 5 and the contact between the radial-direction contact faces and the outer circumferential surface of the stator core 5 are continual. Each of the cooling air paths 329 faces, in the case 32, an outer circumferential surface 422 of the coil end portion 42 of the stator coil 40 and opens inward in the radial direction of the case 32; and at the outer circumferential surface of the stator core 5, each of the cooling air paths 329 opens in the axis direction of the stator core 5.

In the outer circumferential portion of the case 31, there are provided four screw holes 3110 that are arranged around the center axis of the case 31 in such a way as to be spaced by 90° apart from one another and engaged with through-bolts (corresponding to a through-bolt 9 illustrated in FIG. 23); similarly, in the outer circumferential portion of the case 32, there are provided through-holes (unillustrated) that are arranged around the center axis of the case 32 in such a way as to be spaced by 90° apart from one another and that are penetrated by the through-bolt. The four respective screw holes 3110 in the case 31 correspond to the four through-holes in the case 32.

The four through-bolts inserted into the respective through-holes in the case 32 from the side, in the vicinity of the pulley 12, of the vehicle AC generator engage with the corresponding screw holes 3110 and tighten the pair of cases 31 and 32 in such a way that they approach each other, so that the stator 5 is flanked with the pair of cases 31 and 32. Above the outer circumferential surface of the stator core 5, the four through-bolts extend in the axis direction of the stator core 5 between the case 31 and the case 32. The through-bolt and the outer circumferential surface of the stator core 5 face each other with a small gap therebetween. The relationship among the through-bolts, the pair of cases 31 and 32, the stator core 5, and the like is similar to the relationship among the through-bolts 9, the pair of cases 31 and 32, the stator core 5, and the like of the conventional device illustrated in FIG. 23.

The cooling air paths 319 provided in the case 31 are arranged in such a way that several pieces each thereof are situated between the adjacent through-bolts, spaced by an arbitrary distance apart from one another in the circumferential direction of the case 31; the cooling air paths 329 provided in the case 32 are arranged in the same manner as the cooling air paths 319. Accordingly, the cooling air paths 319 and 329 are arranged on the whole circumferential area of the vehicle AC generator 100, whereby variations in the circumferential-direction heat radiation performance are suppressed.

Figure 3:
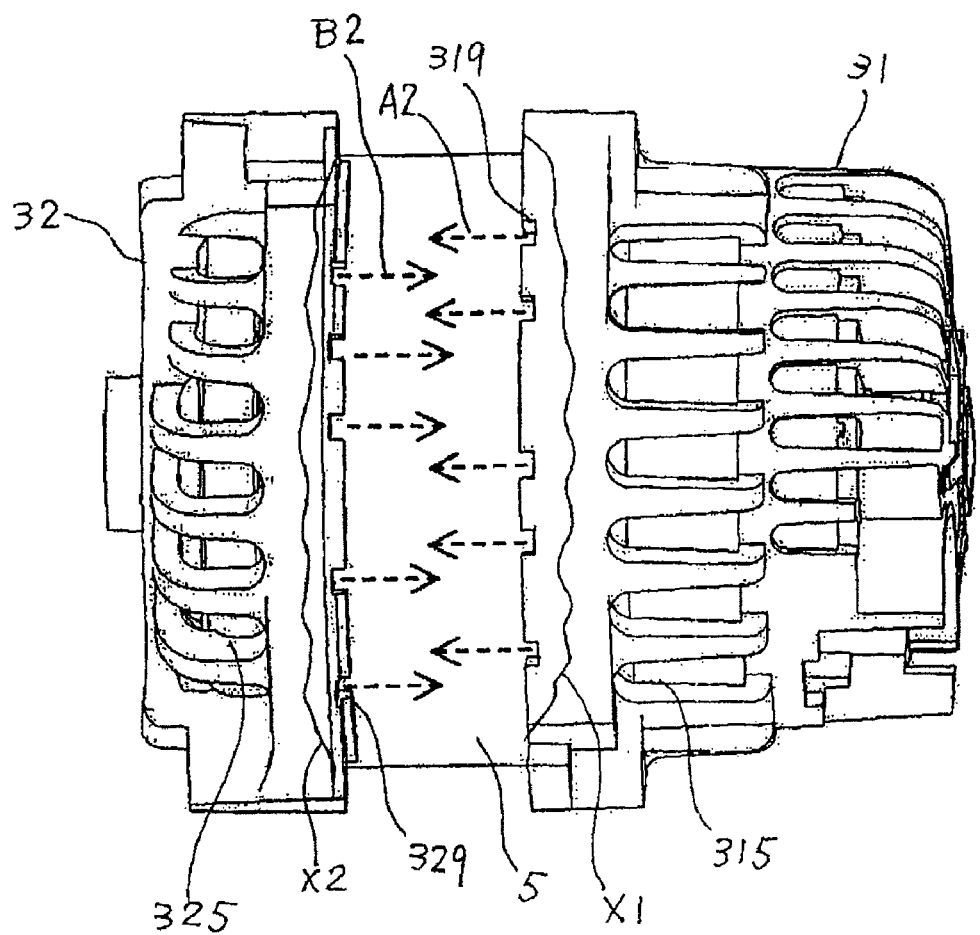
FIG. 3 is a partially broken plan view illustrating a vehicle AC generator according to Embodiment 1 of the present invention.

FIG. 3 is a partially broken plan view illustrating a vehicle AC generator according to Embodiment 1 of the present invention; the cases 31 and 32 are partially broken by the breaking line X1 and X2, and the respective cooling air paths 319 and 329 are expressly illustrated. As illustrated in FIG. 3, the plurality of cooling air paths 319 provided in the case 31 are arranged at the circumferential-direction positions that are different from the circumferential-direction positions where the plurality of cooling air paths 329 provided in the case 32 are arranged; the opening of the cooling air path 319 and the opening of the cooling air path 329 are arranged not to face each other. By configuring the AC generator in such a way as described above, the cooling air A2 that flows through the cooling air path 319 in the case 31 toward the outer circumferential surface of the stator core 5 and the cooling air B2 that flows through the cooling air path 329 in the case 32 toward the outer circumferential surface of the stator core 5 further flow without interfering with each other; therefore, the loss of the cooling air can be reduced.

Figure 4:
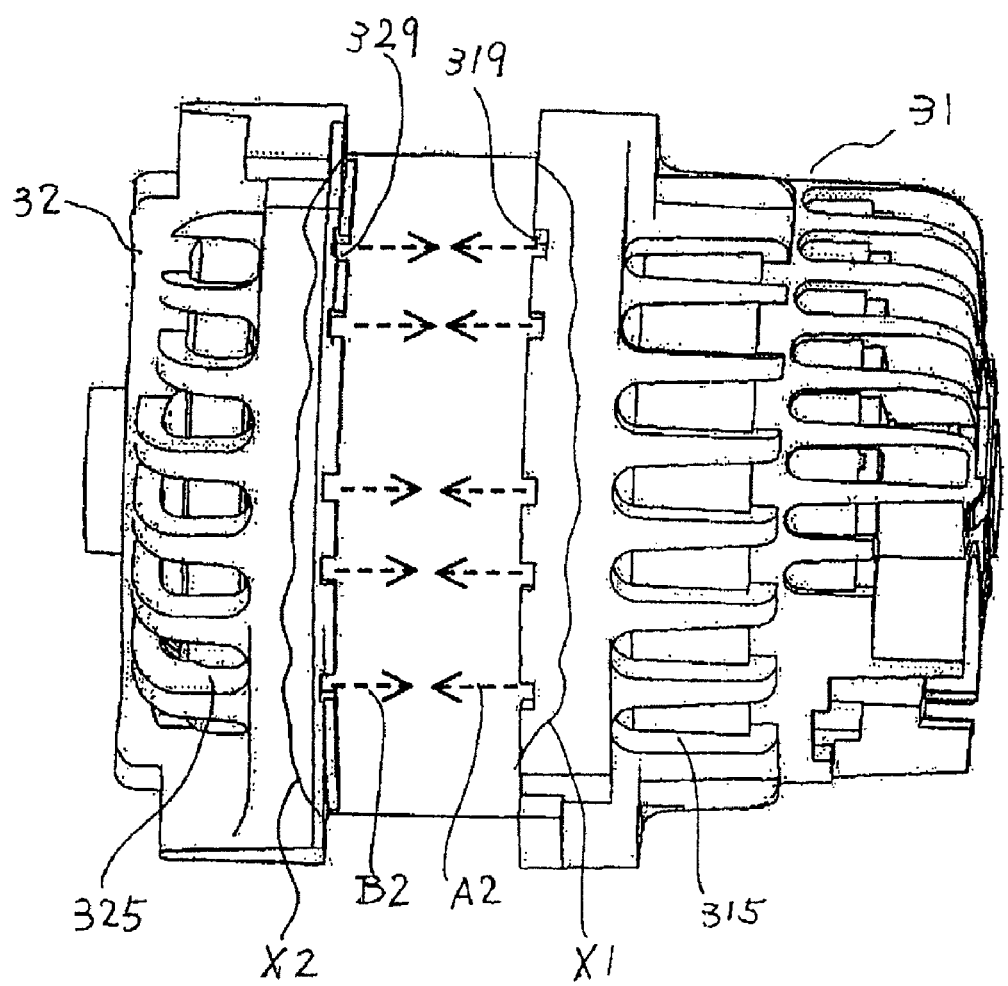
FIG. 4 is a reference view for explaining a vehicle AC generator according to Embodiment 1 of the present invention.

In contrast, as illustrated in FIG. 4, which is a reference view, in the case where the cooling air paths 319 provided in the case 31 are arranged at the positions, in the circumferential direction of the stator core 5, that are the same as the positions where the cooling air paths 329 provided in the case 32 are arranged, the cooling air A2 and the cooling air B2 that flow out through the cooling air paths 319 and 329, respectively, collide with each other over the circumferential surface of the stator core 5; therefore, the loss of the cooling air becomes large. In a vehicle AC generator according to Embodiment 1, the foregoing shortcoming is eliminated.

Figure 5:
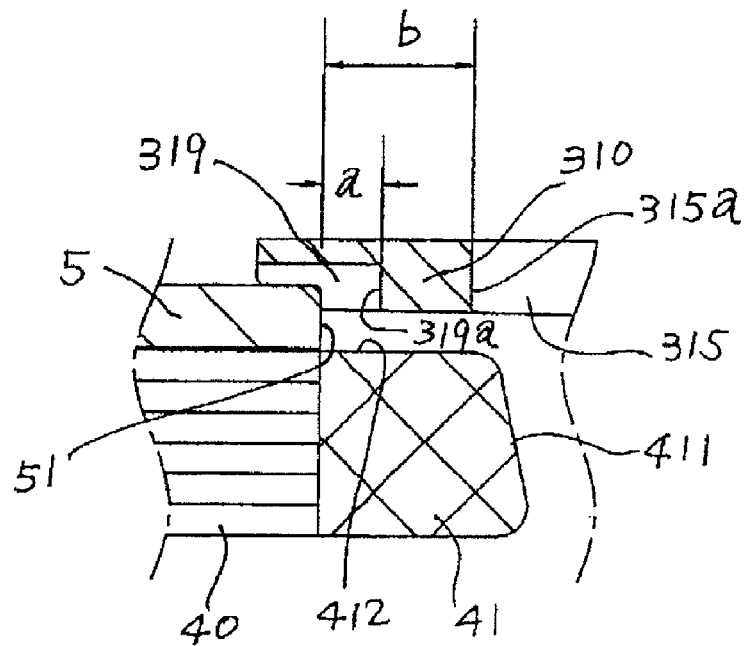
FIG. 5 is an explanatory diagram for a vehicle AC generator according to Embodiment 1 of the present invention.
Figure 6:
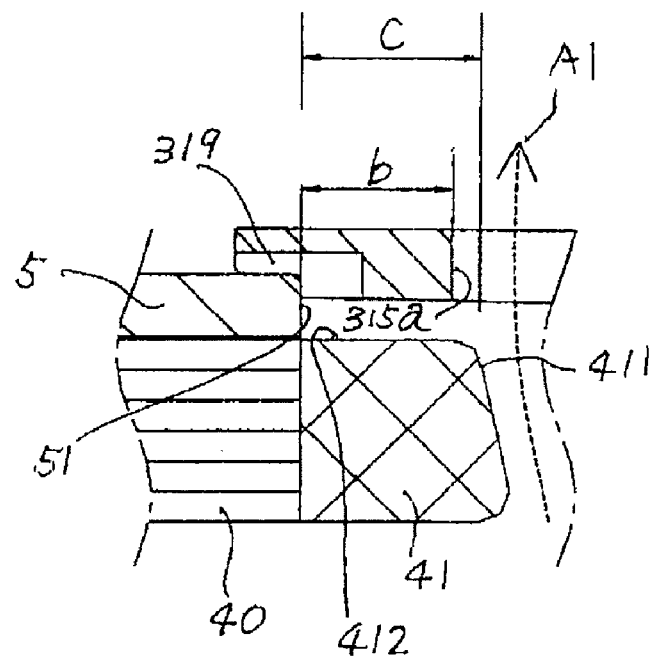
FIG. 6 is an explanatory diagram for a vehicle AC generator according to Embodiment 1 of the present invention.
Figure 7:
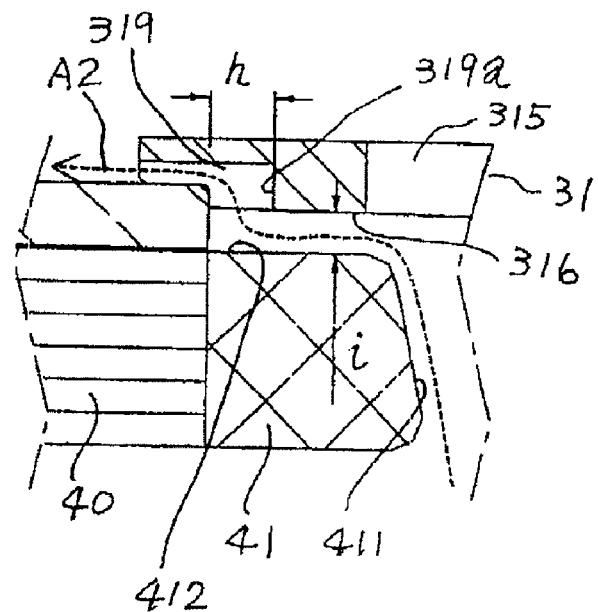
FIG. 7 is an explanatory diagram for a vehicle AC generator according to Embodiment 1 of the present invention.

FIGS. 5, 6, and 7 are each an explanatory diagram for a vehicle AC generator according to Embodiment 1 of the present invention. As illustrated in FIG. 5, the distance "a" between an axis-direction end face 51 of the stator core 5 and a wall face 319a, of the cooling air path 319, that faces the axis-direction end face 51 is set to be the same as or smaller than the distance "b" between the axis-direction end face 51 of the stator core 5 and a wall face 315a of the air outlet 315 provided in the case 31.

As illustrated in FIG. 6, the distance "b" between the axis-direction end face 51 of the stator core 5 and the wall face 315a of the air outlet 315 provided in the case 31 is set to be the same as or smaller than the distance "c" between the axis-direction end face 51 of the stator core 5 and the axis-direction end face 411 of the coil end portion 41 that protrudes in the axis direction from the axis-direction end face 51.

Furthermore, as illustrated in FIG. 7, the distance "h" between the axis-direction end face 51 of the stator core 5 and the wall face 319a, of the cooling air path 319, that faces the axis-direction end face 51 is set to be the same as or larger than the distance "i" between the outer circumferential surface 412 of the coil end portion 41 and the inner circumferential surface 316 of the case 31.

The case 32 is configured in approximately the same manner as the case 31 illustrated in FIGS. 5, 6, and 7.

Next, the cooling operation of the vehicle AC generator according to Embodiment 1 of the present invention will be explained. In FIG. 1, when the rotor 1 rotates, the cooling fans 21 and 22 fixed on the respective end portions thereof rotate along with the rotor 1. Due to the rotations of the cooling fans 21 and 22, the cooling air A and the cooling air B are absorbed into the case through the air inlets 314 and 324 provided in the cases 31 and 32, respectively, and flow into the cooling fans 21 and 22 along the axis direction of the cooling fans. The cooling air A and the cooling air B that have flown into the cooling fans 21 and 22 are radially discharged therefrom by the centrifugal force produced by the rotations of the cooling fans 21 and 22. The cooling air A and the cooling air B that have been discharged from the cooling fans 21 and 22 flow along the axis-direction end faces 411 and 421 of the coil end portions 41 and 42, respectively, and cool the coil end portions 41 and 42 through heat exchange with the coil end portions 41 and 42.

The cooling air A and the cooling air B that have flown outside in the radial direction along the axis-direction end faces 411 and 421 of the coil end portions 41 and 42 ramify into cooling air A1 and cooling air B1, respectively, that are directly discharged outside the case 31 and 32 through the air outlets 315 and 325 provided in the cases 31 and 32 and into cooling air A2 and cooling air B2, respectively, that flow along the outer circumferential surfaces 412 and 422 of the coil end portions 41 and 42 and are discharged to the outer circumferential surface of the stator core 5 through the cooling air paths 319 and 329 provided in the cases 31 and 32. The cooling air A2 and the cooling air B2 obtained through the ramification cool the outer circumferential surfaces 412 and 422, respectively, through heat exchange with them. In Embodiment 1, the flow paths through which the cooling air A1 and the cooling air B1 flow are refereed to as first flow paths, and the flow paths through which the cooling air A2 and the cooling air B2 flow are refereed to as second flow paths.

As described above, the cooling air paths 319 and 329 provided in the cases 31 and 32 have openings situated at the different circumferential-direction positions over the outer circumferential surfaces of the stator core 5; therefore, the cooling air A2 and the cooling air B2 that are discharged in the axis direction over the stator core 5 through the cooling air paths 319 and 329 flow smoothly, as illustrated in FIG. 3, along the outer circumferential surface of the stator core 5 without interfering with each other, and cool the stator core 5 through heat exchange with the stator core 5.

As illustrated in FIG. 5, the distance "a" between an axis-direction end face 51 of the stator core 5 and a wall face 319a, of the cooling air path 319, that faces the axis-direction end face 51 is set to be the same as or smaller than the distance "b" between the axis-direction end face 51 of the stator core 5 and a wall face 315a of the air outlet 315 provided in the case 31; therefore, a rib portion 310 having a width of [b-a] is provided between the air outlet 315 of the case 31 and the cooling air path 319 and over the whole circumference of the case 31; as a result, the case 31 can become sufficiently rigid. A rib portion is provided over the whole circumference of the case 32 in approximately the same manner as the case 31.

Moreover, as illustrated in FIG. 6, the distance "b" between the axis-direction end face 51 of the stator core 5 and the wall face 315a of the air outlet 315 provided in the case 31 is set to be the same as or smaller than the distance "c" between the axis-direction end face 51 of the stator core 5 and the axis-direction end face 411 of the coil end portion 41 that protrudes in the axis direction from the axis-direction end face 51; therefore, the cooling air A1 that flows along the axis-direction end face 411 of the coil end portion 41 can be discharged through the air outlet 315 of the case 31 without being obstructed by the case 31. The case 32 is configured in approximately the same manner as the case 31.

Furthermore, as illustrated in FIG. 7, the distance "h" between the axis-direction end face 51 of the stator core 5 and the wall face 319a, of the cooling air path 319, that faces the axis-direction end face 51 is set to be the same as or larger than the distance "i" between the outer circumferential surface 412 of the coil end portion 41 and the inner circumferential surface 316 of the case 31; therefore, there is secured a flow path width that is necessary for the cooling air A2 to pass through the cooling air path 319 almost without suffering any loss, whereby the pressure loss can be suppressed. The case 32 is configured in approximately the same manner as the case 31.

Figure 8:
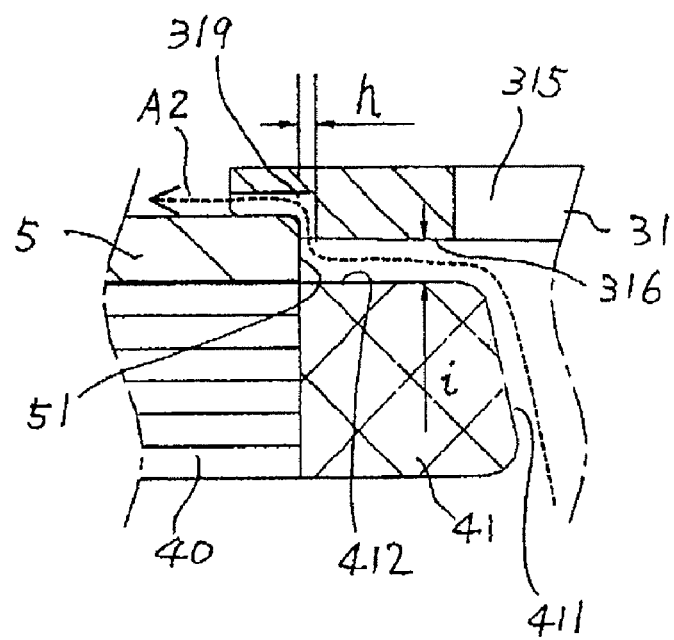
FIG. 8 is a reference view for explaining a vehicle AC generator according to Embodiment 1 of the present invention.

FIG. 8 is a reference view for explaining a vehicle AC generator according to Embodiment 1 of the present invention; FIG. 8 illustrates the case where the distance "h" between the axis-direction end face 51 of the stator core 5 and the wall face, of the cooling air path 319, that faces the axis-direction end face 51 is set to be the same as or smaller than the distance "i" between the outer circumferential surface 412 of the coil end portion 41 and the inner circumferential surface 316 of the case 31. In this case, when the cooling air A2 enters the cooling air path 319 from the outer circumferential surface 412 of the coil end portion 41, the cross-sectional area of the cooling air path 319 is reduced; thus, compared with the vehicle AC generator according to Embodiment 1 of the present invention, the pressure loss is enlarged, whereby the amount of cooling air is diminished, and hence the cooling effect is reduced.

As described above, in the vehicle AC generator according to Embodiment 1 of the present invention, in addition to an air outlet provided in the case of a conventional vehicle AC generator, there is provided a cooling air path that discharges cooling air in the axis direction of the stator core at the vicinity of the outer circumferential surface of the stator core; therefore, the area of the air path is enlarged and the amount of cooling air in the whole AC generator is increased, whereby the heat radiation performances of not only the coil end portion but also the stator core and other heat generating portions are raised.

The through-hole cooling air paths 319 and 329 also have a function as a drainage hole; therefore, electrolytic corrosion and salt erosion can be prevented from being caused by water that remains in the generator.

By producing the cases 31 and 32, for example, through molding such as die-casting, additional machining for forming the cooling air paths 319 and 329 is not required, whereby the production cost can be reduced. Furthermore, in the case where it is required to provide an INRO-type joint in the stator core through cutting processing, the stator core is cut in a discontinuous manner along the groove of the case; therefore, machining swarf does not wind around the machining tool, whereby the lifetime of the machining tool can be extended.

The pitches, the numbers, the cross-section shapes, and the like of the cooling air paths and air outlets provided in the cases 31 and 32 are not limited to the foregoing examples. In Embodiment 1 described above, there has been explained the case where the cooling air paths 319 and 329 are provided in the cases 31 and 32, respectively; however, the cooling air paths may be formed in the stator core 5, or the cooling air paths may be formed in the cases 31 and 32 and the stator core 5. The cooling air paths may be provided at either one of the axis-direction end portions of the stator 6.

Embodiment 2

Figure 9:
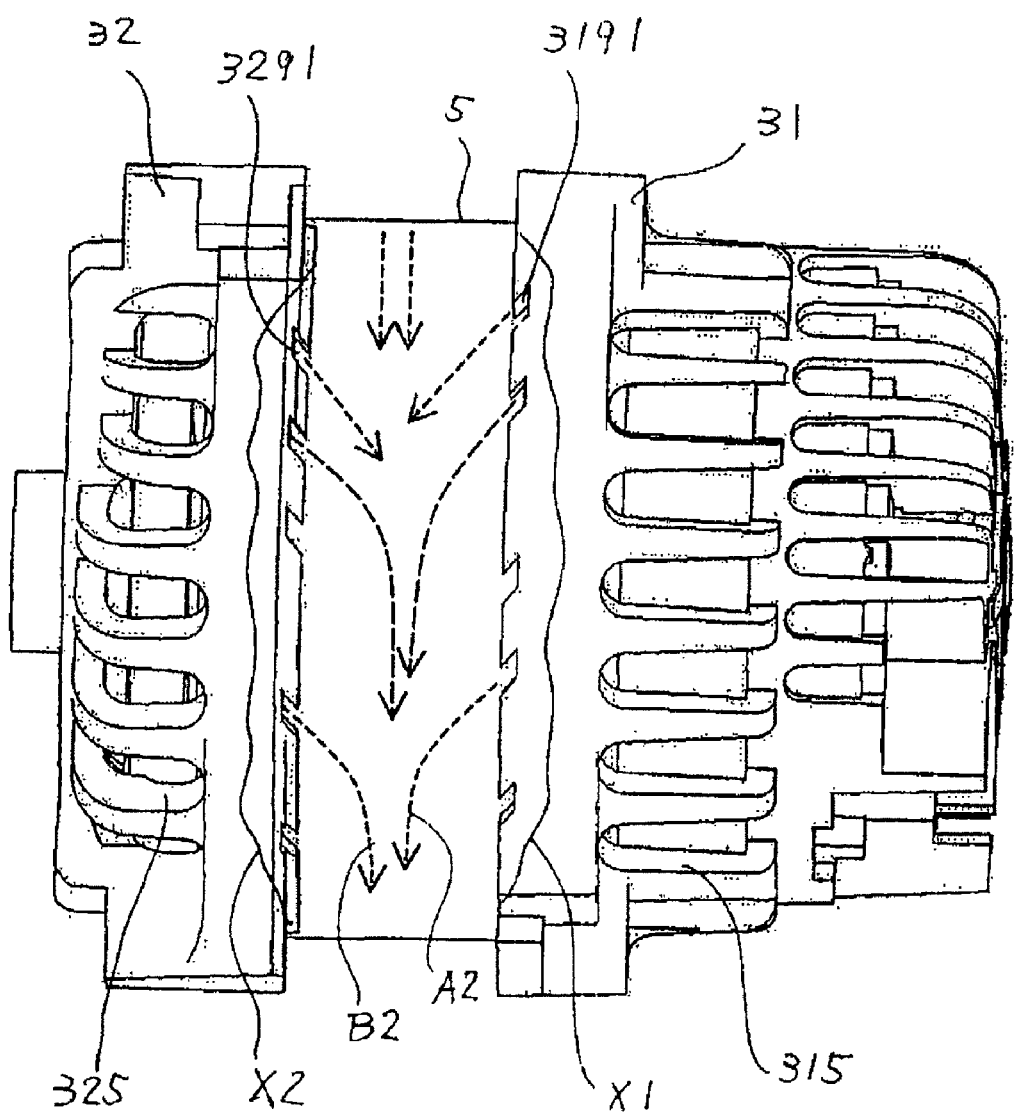
FIG. 9 is a partially broken plan view illustrating a vehicle AC generator according to Embodiment 2 of the present invention.

FIG. 9 is a partially broken plan view illustrating a vehicle AC generator according to Embodiment 2 of the present invention; the cases 31 and 32 are partially broken by the breaking line X1 and X2, and respective cooling air paths 3191 and 3291 are expressly illustrated. In FIG. 9, the cooling air path 3191 provided in the case 31 and the cooling air path 3291 provided in the case 32 are formed in such a way as to be slanted toward the respective rotation directions of the cooling fans. The other configurations are the same as those in Embodiment 1.

In the vehicle AC generator according to Embodiment 2, cooling air A2 and cooling air B2 discharged from the cooling air paths 3191 and 3291 provided in the cases 31 and 32 to the outer circumferential surface of the stator core 5 join with each other on the outer circumferential surface of the stator core 5 and flow in the circumferential direction of the stator core 5; therefore, there is demonstrated an effect in which the radiation of the heat of the stator core 5 is facilitated.

The through-hole cooling air paths 3191 and 3291 also have a function as a drainage hole; therefore, electrolytic corrosion and salt erosion can be prevented from being caused by water that remains in the generator.

By producing the cases 31 and 32, for example, through molding such as die-casting, additional machining for forming the cooling air paths 3191 and 3291 is not required, whereby the production cost can be reduced. Furthermore, in the case where it is required to provide an INRO-type joint in the stator core through cutting processing, the stator core is cut in a discontinuous manner along the groove of the case; therefore, machining swarf does not wind around the machining tool, whereby the lifetime of the machining tool can be extended.

The pitches, the numbers, the cross-section shapes, and the like of the cooling air paths and air outlets provided in the cases 31 and 32 are not limited to the foregoing examples. In Embodiment 2 described above, there has been explained the case where the cooling air paths 3191 and 3291 are provided in the cases 31 and 32, respectively; however, the cooling air paths may be formed in the stator core 5, or the cooling air paths may be formed in the cases 31 and 32 and the stator core 5. The cooling air paths may be provided at either one of the axis-direction end portions of the stator 6.

Embodiment 3

Figure 10:
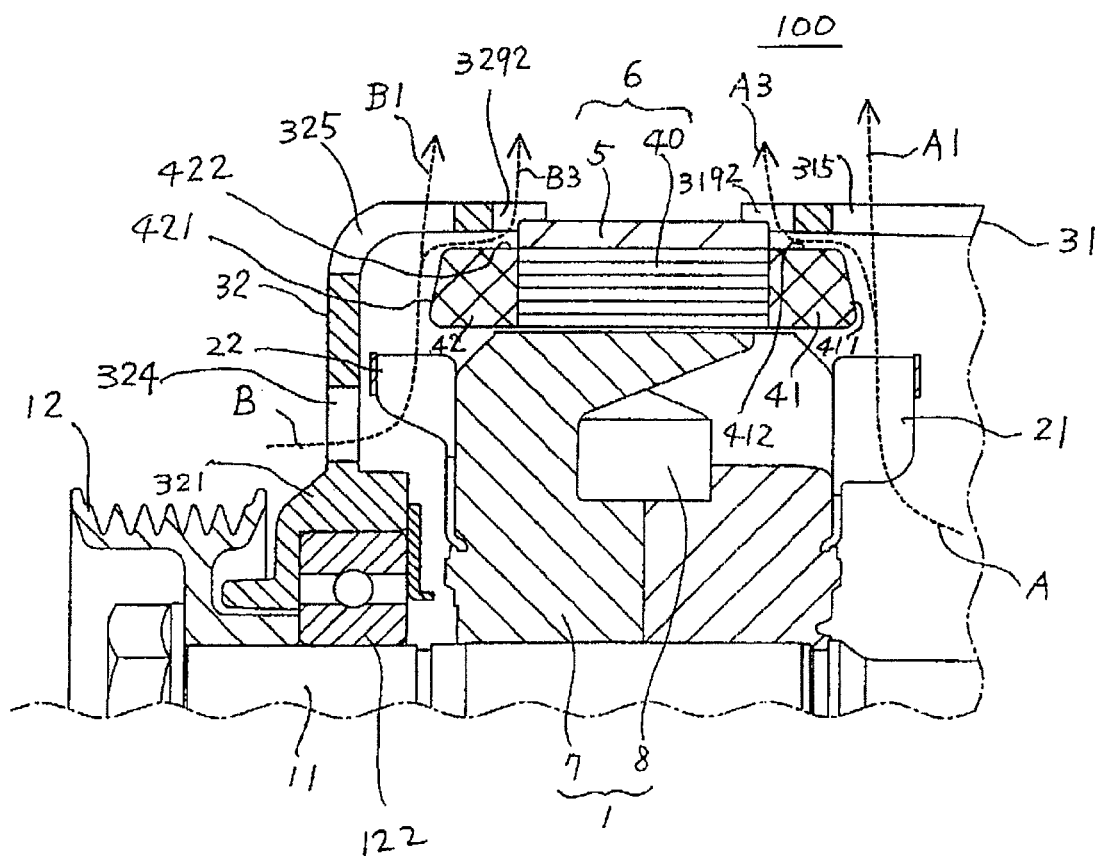
FIG. 10 is a cross-sectional view of principal parts of a vehicle AC generator according to Embodiment 3 of the present invention.

FIG. 10 is a cross-sectional view illustrating principal parts of a vehicle AC generator according to Embodiment 3 of the present invention. In FIG. 10, at the axis-direction end face and the radial-direction end face that face the axis-direction end face and the adjacent outer circumferential surface of the stator core 5, the case 31 (32) has a cooling air path 3192 (3292) that is formed of a notch-shaped cutout that penetrates the cases 31 (32) in the radial direction thereof. The cooling air path 3192 (3292) connects the outer circumferential surface 412 (422) of the coil end portion 41 (42) with the outer circumferential surface of the stator core 5, and has an openings that faces in the radial direction of the stator core 5 at the outer circumferential surface of the stator core 5

Figure 11:
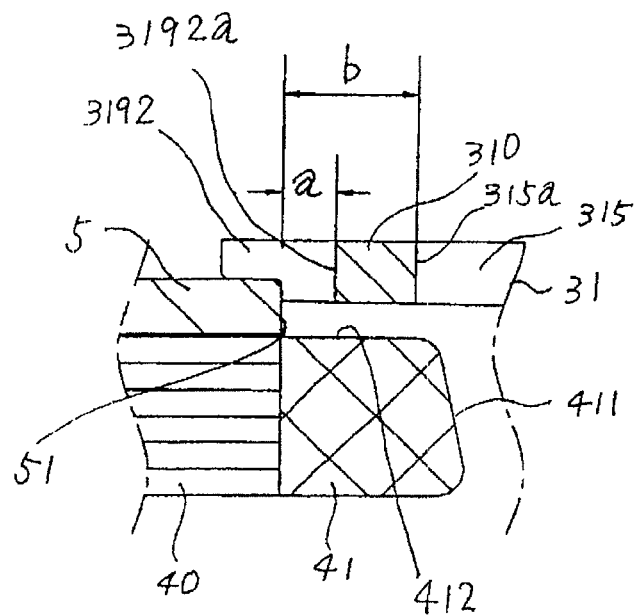
FIG. 11 is an explanatory diagram for a vehicle AC generator according to Embodiment 3 of the present invention.
Figure 12:
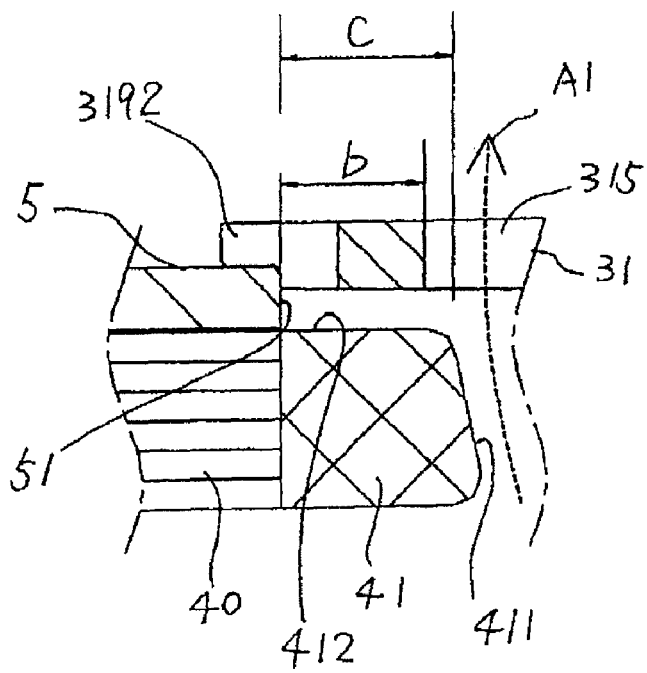
FIG. 12 is an explanatory diagram for a vehicle AC generator according to Embodiment 3 of the present invention.
Figure 13:
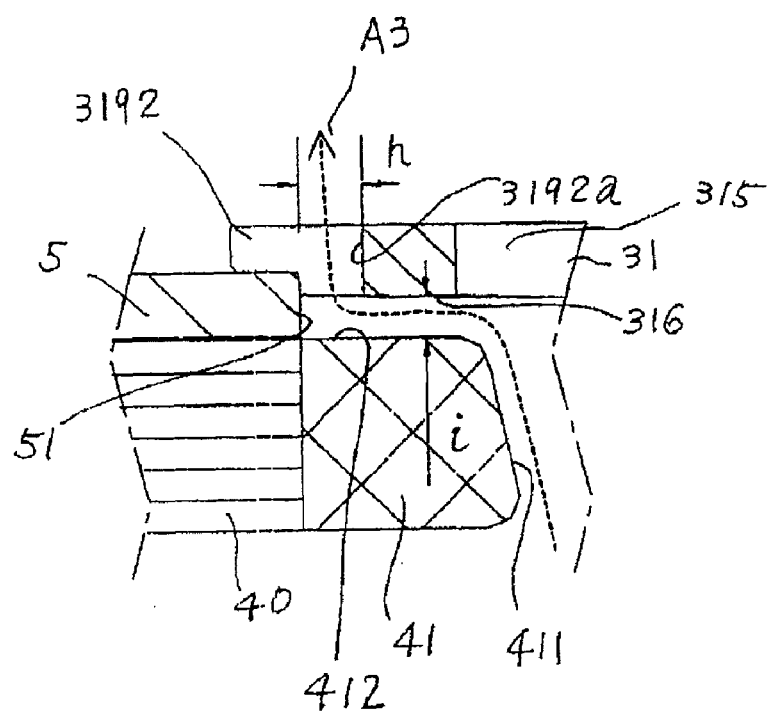
FIG. 13 is an explanatory diagram for a vehicle AC generator according to Embodiment 3 of the present invention.

FIGS. 11, 12, and 13 are each an explanatory diagram for a vehicle AC generator according to Embodiment 2 of the present invention. As illustrated in FIG. 11, the distance "a" between an axis-direction end face 51 of the stator core 5 and a wall face 3192a, of the cooling air path 3192, that faces the axis-direction end face 51 is set to be the same as or smaller than the distance "b" between the axis-direction end face 51 of the stator core 5 and a wall face 315a of the air outlet 315 provided in the case 31.

As illustrated in FIG. 12, the distance "b" between the axis-direction end face 51 of the stator core 5 and the wall face 315a of the air outlet 315 provided in the case 31 is set to be the same as or smaller than the distance "c" between the axis-direction end face 51 of the stator core 5 and the axis-direction end face 411 of the coil end portion 41 that protrudes in the axis direction from the axis-direction end face 51.

Furthermore, as illustrated in FIG. 13, the distance "h" between the axis-direction end face 51 of the stator core 5 and the wall face 3192a, of the cooling air path 3192, that faces the axis-direction end face 51 is set to be the same as or larger than the distance "i" between the outer circumferential surface 412 of the coil end portion 41 and the inner circumferential surface 316 of the case 31.

The case 32 is configured in approximately the same manner as the case 31 illustrated in FIGS. 11, 12, and 13. The other configurations are the same as those in Embodiment 1.

Next, in the vehicle AC generator, configured as described above, according to Embodiment 3 of the present invention, when the rotor 1 rotates, the cooling fans 21 and 22 fixed on the respective end portions thereof rotate along with the rotor 1. Due to the rotations of the cooling fans 21 and 22, the cooling air A and the cooling air B are absorbed into the case through the air inlets 314 and 324 provided in the cases 31 and 32, respectively, and absorbed by the cooling fans 21 and 22 along the axis direction of the cooling fans; then, the cooling air A and the cooling air B are discharged in the radial direction by the centrifugal force produced through the rotations of the fans 21 and 22. The cooling air A and the cooling air B that have been discharged from the cooling fans 21 and 22 flow in the radial direction along the axis-direction end faces 411 and 421 of the coil end portions 41 and 42, respectively, and cool the coil end portions 41 and 42 through heat exchange with the coil end portions 41 and 42.

The cooling air A and the cooling air B that have flown in the radial direction along the axis-direction end faces 411 and 421 of the coil end portions 41 and 42 ramify into cooling air A1 and cooling air B1, respectively, that are directly discharged outside the case 31 and 32 through the air outlets 315 and 325 provided in the cases 31 and 32 and into cooling air A3 and cooling air B3, respectively, that flow along the outer circumferential surfaces 412 and 422 of the coil end portions 41 and 42 and are discharged in the radial direction at the outer circumferential surface of the stator core 5 through the cooling air paths 3192 and 3292 provided in the cases 31 and 32. In Embodiment 3, the flow paths through which the cooling air A1 and the cooling air B1 flow are refereed to as first flow paths, and the flow paths through which the cooling air A3 and the cooling air B3 flow are refereed to as second flow paths.

As illustrated in FIG. 11, the distance "a" between an axis-direction end face 51 of the stator core 5 and a wall face 3192a, of the cooling air path 3192, that faces the axis-direction end face 51 is set to be the same as or smaller than the distance "b" between the axis-direction end face 51 of the stator core 5 and a wall face 315a of the air outlet 315 provided in the case 31; therefore, a rib portion 310 having a width of [b-a] is provided between the air outlet 315 of the case 31 and the cooling air path 3192 and over the whole circumference of the case 31; as a result, the case 31 can become sufficiently rigid. A rib portion is provided over the whole circumference of the case 32 in approximately the same manner as the case 31.

As illustrated in FIG. 12, the distance "b" between the axis-direction end face 51 of the stator core 5 and the wall face 315*a* of the air outlet 315 provided in the case 31 is set to be the same as or smaller than the distance "c" between the axis-direction end face 51 of the stator core 5 and the axis-direction end face 411 of the coil end portion 41 that protrudes in the axis direction from the axis-direction end face 51; therefore, the cooling air A1 that flows along the axis-direction end face 411 of the coil end portion 41 can be discharged through the air outlet 315 of the case 31 without being obstructed by the case 31. The case 32 is configured in approximately the same manner as the case 31.

Furthermore, as illustrated in FIG. 13, the distance "h" between the axis-direction end face 51 of the stator core 5 and the wall face 319*a*, of the cooling air path 3192, that faces the axis-direction end face 51 is set to be the same as or larger than the distance "i" between the outer circumferential surface 412 of the coil end portion 41 and the inner circumferential surface 316 of the case 31; therefore, there is secured a flow path width that is necessary for the cooling air A2 to pass through the cooling air path 319 almost without suffering any loss, whereby the pressure loss can be suppressed. The case 32 is configured in approximately the same manner as the case 31.

Figure 14:
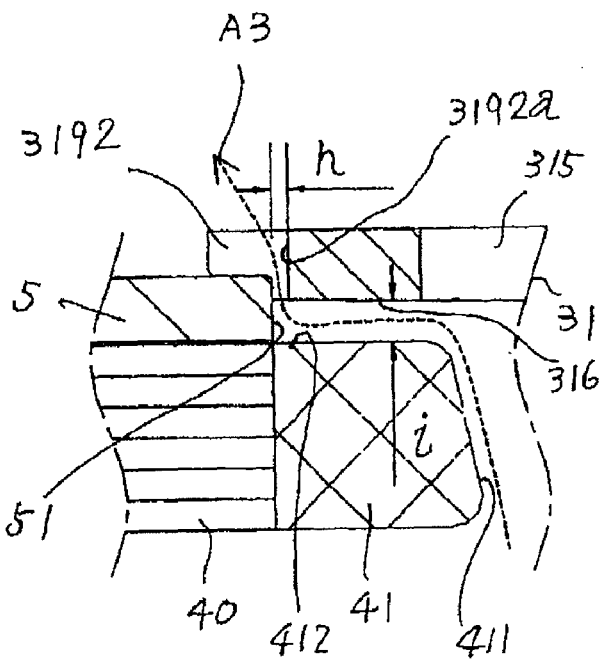
FIG. 14 is a reference view for explaining a vehicle AC generator according to Embodiment 3 of the present invention.

FIG. 14 is a reference view for explaining a vehicle AC generator according to Embodiment 3 of the present invention; FIG. 14 illustrates the case where the distance "h" between the axis-direction end face 51 of the stator core 5 and the wall face 3192*a*, of the cooling air path 3192, that faces the axis-direction end face 51 is set to be the same as or smaller than the distance "i" between the outer circumferential surface 412 of the coil end portion 41 and the inner circumferential surface 316 of the case 31. In this case, when the cooling air A3 enters the cooling air path 3192 from the outer circumferential surface 412 of the coil end portion 41, the cross-sectional area of the cooling air path 3192 is reduced; thus, compared with the vehicle AC generator according to Embodiment 3 of the present invention, the pressure loss is enlarged, whereby the amount of cooling air is diminished, and hence the cooling effect is reduced.

As described above, in the vehicle AC generator according to Embodiment 3 of the present invention, in addition to an air outlet provided in the case of a conventional vehicle AC generator, there is provided a cooling air path that discharges cooling air in the radial direction on the outer circumferential surface of the stator core; therefore, the air discharging area is enlarged and the amount of cooling air in the whole AC generator is increased, whereby the heat radiation performances of not only the coil end portion but also the stator core and other heat generating portions are raised.

The through-hole cooling air paths 3192 and 3292 also have a function as a drainage hole; therefore, electrolytic corrosion and salt erosion can be prevented from being caused by water that remains in the generator.

By producing the cases 31 and 32, for example, through molding such as die-casting, additional machining for forming the cooling air paths 3192 and 3292 is not required, whereby the production cost can be reduced. Furthermore, in the case where it is required to provide an INRO-type joint in the stator core through cutting processing, the stator core is cut in a discontinuous manner along the groove of the case; therefore, machining swarf does not wind around the machining tool, whereby the lifetime of the machining tool can be extended.

The pitches, the numbers, the cross-section shapes, and the like of the cooling air paths and air outlets provided in the cases 31 and 32 are not limited to the foregoing examples. In Embodiment 3 described above, there has been explained the case where the cooling air paths 3192 and 3292 are provided in the cases 31 and 32, respectively; however, the cooling air paths may be formed in the stator core 5, or the cooling air paths may be formed in the cases 31 and 32 and the stator core 5. The cooling air paths may be provided at either one of the axis-direction end portions of the stator 6.

Embodiment 4

Figure 15:
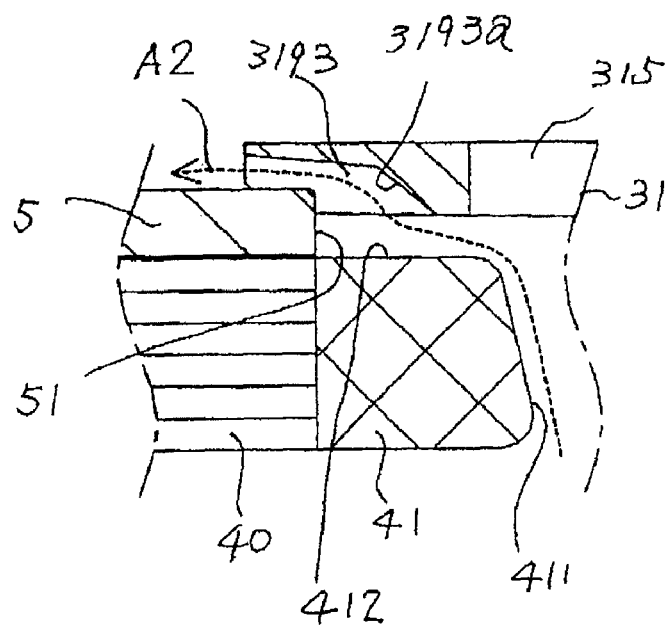
FIG. 15 is an explanatory diagram for a vehicle AC generator according to Embodiment 4 of the present invention.

FIG. 15 is an explanatory diagram for a vehicle AC generator according to Embodiment 4 of the present invention. In FIG. 15, a cooling air path 3193 formed in the case 31 has an axis-direction opening at the outer circumferential surface of the stator core 5, and an inner wall 3193*a* is slanted in the axis direction of the stator core 5. A cooling air path provided in the other case is formed approximately in the same manner as the cooling air path formed in the case 31. The other configurations are the same as those in Embodiment 1.

In the vehicle AC generator, according to Embodiment 4, configured as described above, the inner wall 3193*a* of the cooling air path 3193 is provided in such a way as to be slanted in the axis direction; therefore, the cooling air A2 smoothly enters the cooling air path 3193 from the outer circumferential surface of the coil end portion 41, whereby the loss of cooling air can be reduced.

In Embodiment 4, the cooling air paths may be provided at either one of the axis-direction end portions of the stator 6.

Embodiment 5

Figure 16:
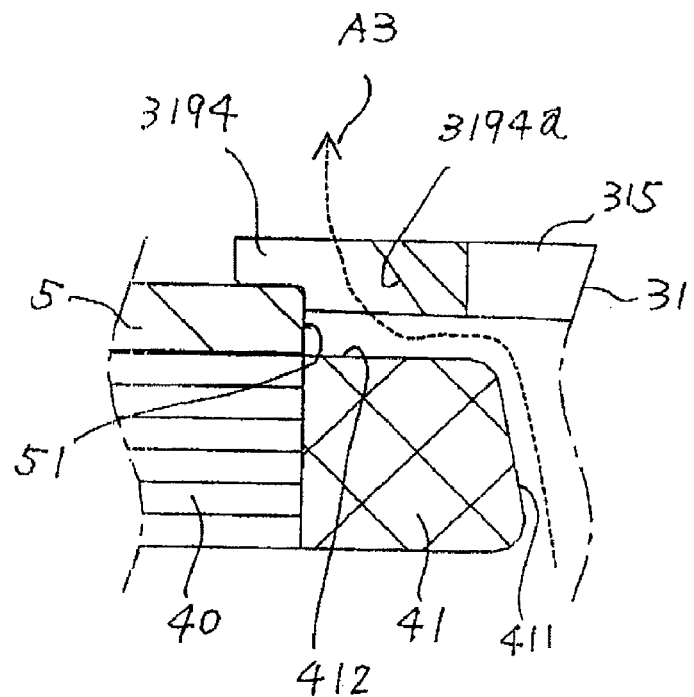
FIG. 16 is an explanatory diagram for a vehicle AC generator according to Embodiment 5 of the present invention.

FIG. 16 is an explanatory diagram for a vehicle AC generator according to Embodiment 5 of the present invention. In FIG. 16, a cooling air path 3194 formed in the case 31 has a radial-direction opening at the outer circumferential surface of the stator core 5, and an inner wall 3194*a* is slanted in the axis direction of the stator core 5. A cooling air path provided in the other case is formed approximately in the same manner as the cooling air path formed in the case 31. The other configurations are the same as those in Embodiment 1.

In the vehicle AC generator according to Embodiment 5, the inner wall 3194*a* of the cooling air path 3194 is provided in such a way as to be slanted in the axis direction; therefore, the cooling air A3 smoothly enters the cooling air path 3194 from the outer circumferential surface 412 of the coil end portion 41, whereby the loss of cooling air can be reduced.

In Embodiment 5, the cooling air paths may be provided at either one of the axis-direction end portions of the stator 6.

Embodiment 6

Figure 17:
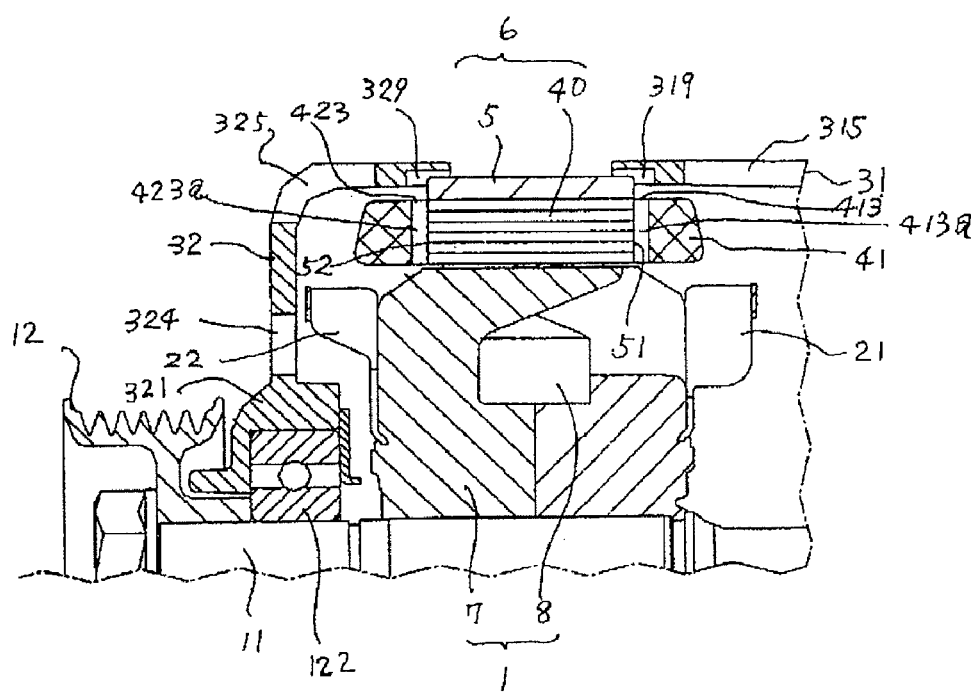
FIG. 17 is a cross-sectional view of principal parts of a vehicle AC generator according to Embodiment 6 of the present invention.
Figure 18:
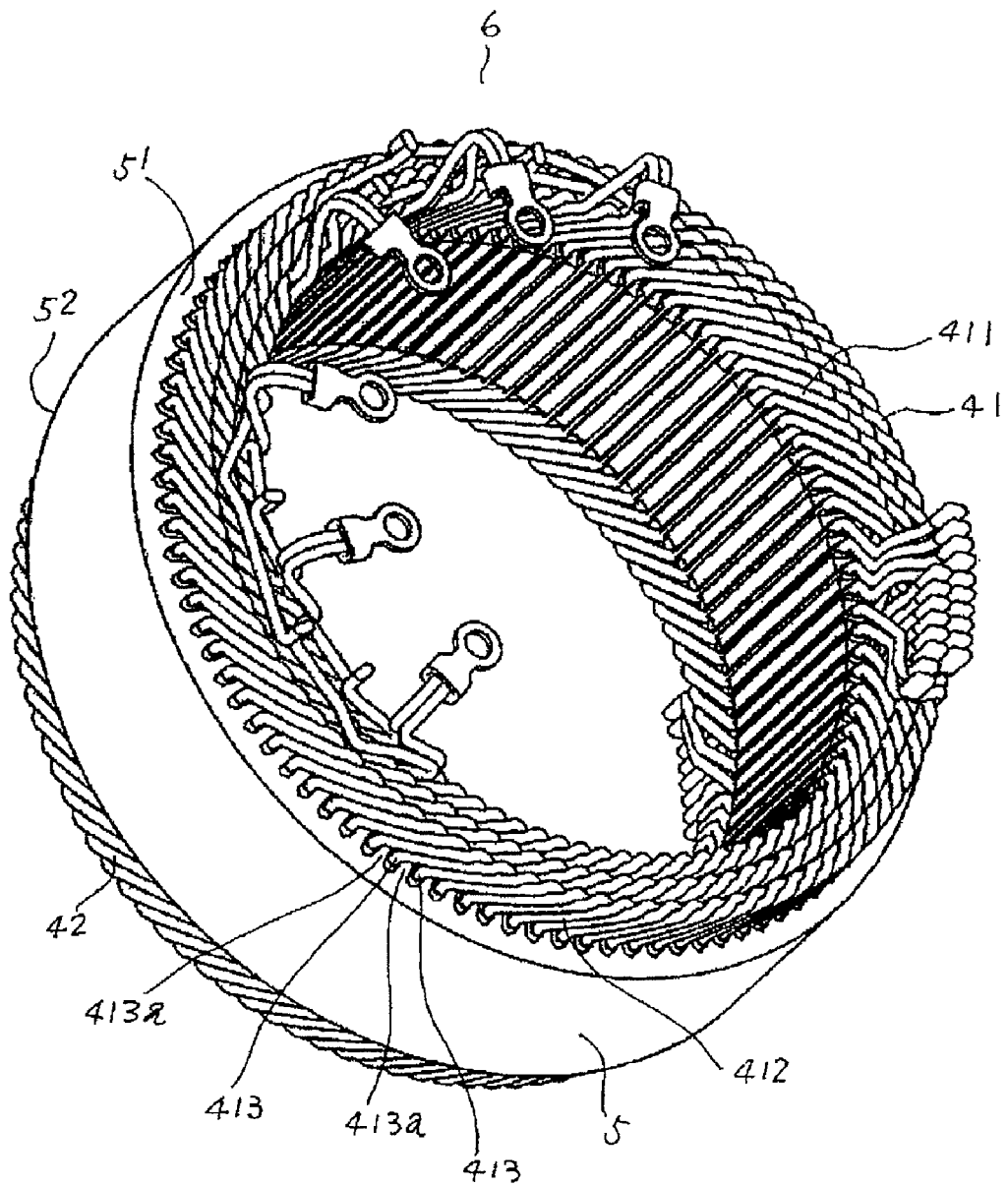
FIG. 18 is a schematic perspective view of the stator of a vehicle AC generator according to Embodiment 6 of the present invention.

FIG. 17 is a cross-sectional view of principal parts of a vehicle AC generator according to Embodiment 6 of the present invention; FIG. 18 is a schematic perspective view of the stator thereof. In FIGS. 17 and 18, a plurality of coil conductors that are contained in the slots of the stator 5 and arranged in the depth direction of the slot protrude from the slots in the axis direction at the axis-direction end faces 51 and 52 of the stator core 5, thereby forming coil root portion rows 413 and 423.

The coil root portion rows 413 and 423 extend in the depth direction of the slot. At the axis-direction end face 51 (52) of the stator core 5, the adjacent coil root portion rows 413 (423) form a core end face space portion 413a (423a) that protrudes in the depth direction of the slot, i.e., in the radial direction of the stator core 5. The core end face space portion 413a (423a) is provided in such a way as to face the coil-end opening of a cooling air path 319 (329) formed in the case 31 (32). The other configurations are the same as those in Embodiment 1.

Figure 19:
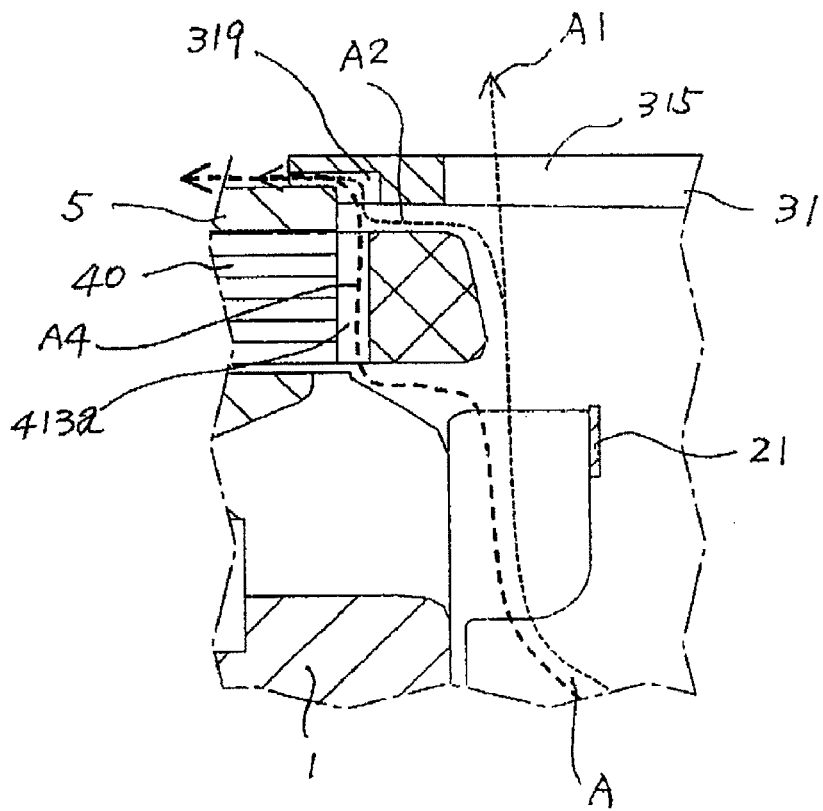
FIG. 19 is an explanatory diagram for a vehicle AC generator according to Embodiment 6 of the present invention.

In the vehicle AC generator, according to Embodiment 6, configured as described above, as illustrated in FIG. 19, cooling air A that has been bent to the radial direction through the rotation of the cooling fan 21 ramifies into cooling air A4 that enters the core end face space portion 413a along the inner circumferential surface 414 of the coil end portion 41, cooling air A1 that flows along the coil end face 411 and then is discharged outside through the air outlet 315 of the case 31, and cooling air A2 that flows along the outer circumferential surface 412 of the coil end portion 41. The cooling air A2 and the cooling air A4 enter the cooling air path 319 and then are discharged in the axis direction to the outer circumferential surface of the stator 5. Although not illustrated, cooling air B1, cooling air B2, and cooling air B4 corresponding to the cooling air A1, the cooling air A2, and the cooling air A4 flow also in the case 32. In Embodiment 6, the flow path through which the cooling air A1 (B1) flows is refereed to as a first flow path, and the flow path through which the cooling air A2 (B2) flows is refereed to as a second flow path, and the flow path through which the cooling air A4 (B4) flows is refereed to as a third flow path.

In the vehicle AC generator according to Embodiment 6, between the coil root portion rows 413 423, there are formed a plurality of core end face space portions 413a 423a that extend in the depth direction of the slot along the axis-direction end face 51 52 of the stator core 5; therefore, the cooling air A4 that enters the core end face space portion 413a 423a through the inner circumferential face 414 424 of the coil end portion 41 42 cools the inner circumferential face 414 424 of the coil end portion 41 42 and the coil root portion rows 413 423. Accordingly, the cooling effect on the coil end portion 41 42 can extremely be enhanced in synergy with the cooling effects of the cooling air A1, A2 on the coil end portion 41 42.

Because, in addition to the configuration according to Embodiment 1, the core end face space portions 413a and 423a are newly formed, the number of the air paths increases; as a result, the amount of cooling air increases, whereby the cooling effect not only the coil end portions 41 and 42 but also other heat generation portions such as the stator core 5 is raised. Furthermore, the core end face space portion 413a, 423a is provided in such a way as to face the coil-end opening of the cooling air path 319, 329 formed in the case 31, 32; therefore, the cooling air A4 that has passed through the core end face space portion 413a, 423a is discharged to the outside of the case 31, 32, whereby the cooling effect can further be enhanced.

The through-hole cooling air paths 319 and 329 also have a function as a drainage hole; therefore, electrolytic corrosion and salt erosion can be prevented from being caused by water that remains in the generator.

By producing the cases 31 and 32, for example, through molding such as die-casting, additional machining for forming the cooling air paths 319 and 329 is not required, whereby the production cost can be reduced. Furthermore, in the case where it is required to provide an INRO-type joint in the stator core through cutting processing, the stator core is cut in a discontinuous manner along the groove of the case; therefore, machining swarf does not wind around the machining tool, whereby the lifetime of the machining tool can be extended.

The pitches, the numbers, the cross-section shapes, and the like of the cooling air paths and air outlets provided in the cases 31 and 32 are not limited to the foregoing examples. In Embodiment 1 described above, there has been explained the case where the cooling air paths 319 and 329 are provided in the cases 31 and 32, respectively; however, the cooling air paths may be formed in the stator core 5, or the cooling air paths may be formed in the cases 31 and 32 and the stator core 5. The cooling air paths may be provided at either one of the axis-direction end portions of the stator 6.

Embodiment 7

Figure 20:
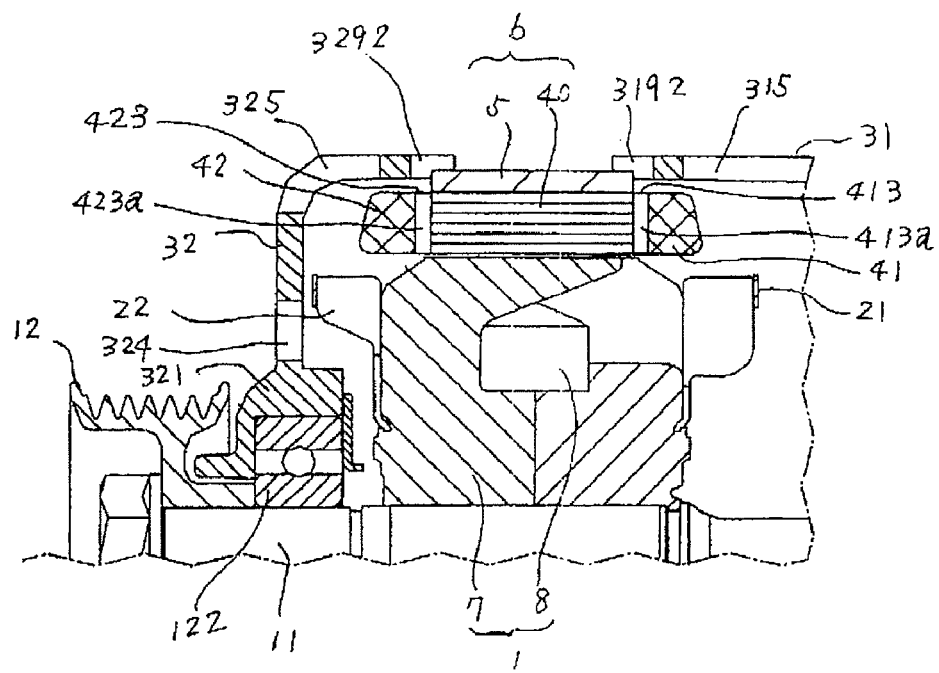
FIG. 20 is a cross-sectional view of principal parts of a vehicle AC generator according to Embodiment 7 of the present invention.

FIG. 20 is a cross-sectional view of principal parts of a vehicle AC generator according to Embodiment 7 of the present invention. In FIG. 20, at the axis-direction end face that faces the axis-direction end face and the adjacent outer circumferential surface of the stator core 5, the case 31 (32) has a cooling air path 3192 (3292) that is formed of a notch-shaped cutout that penetrates the case 31 (32) in the radial direction thereof. The cooling air path 3192 (3292) connects the outer circumferential surface 412 (422) of the coil end portion 41 (42) with the outer circumferential surface of the stator core 5, and has an openings that faces in the radial direction of the stator core 5 at the outer circumferential surface of the stator core 5. Other configurations are the same as those in Embodiment 6.

Figure 21:
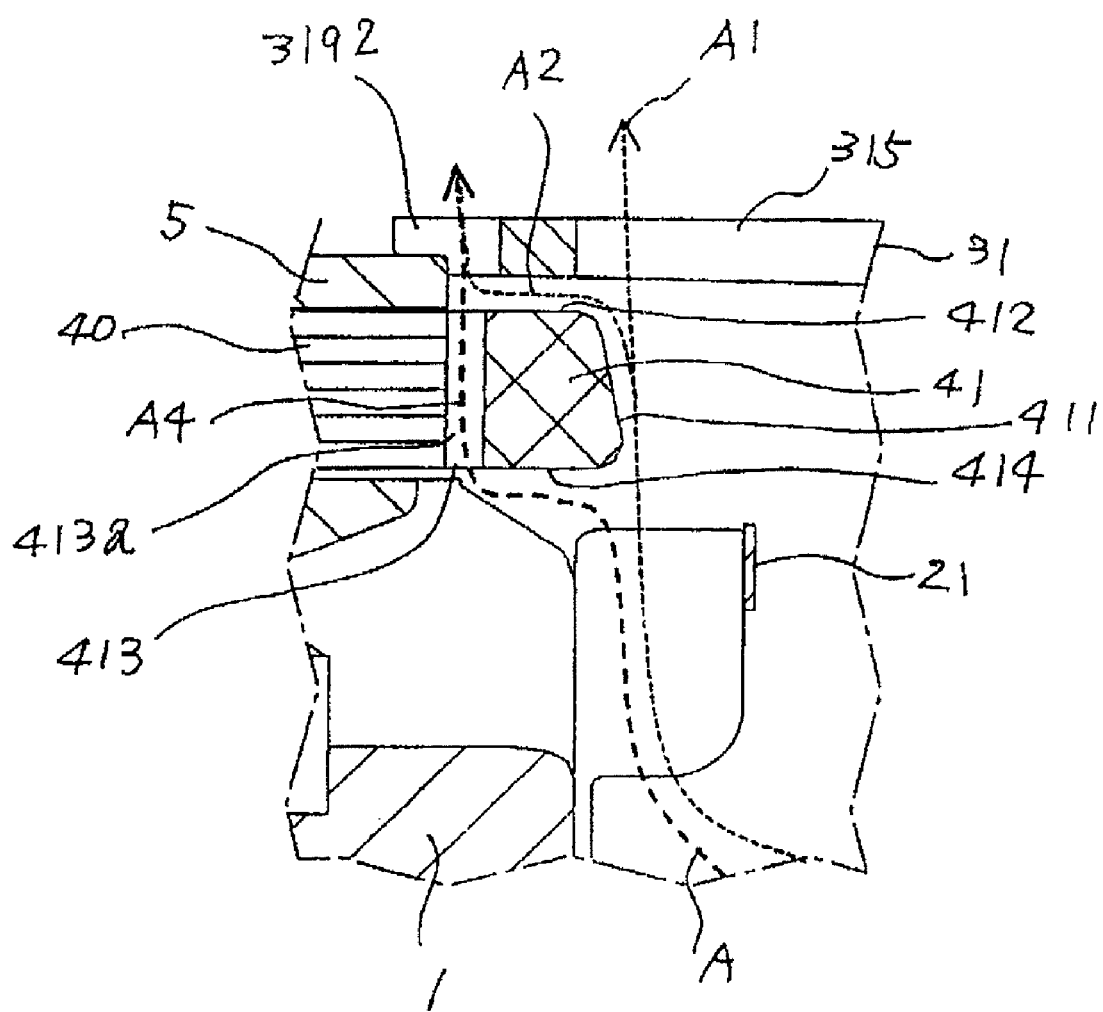
FIG. 21 is an explanatory diagram for a vehicle AC generator according to Embodiment 7 of the present invention.

In the vehicle AC generator, according to Embodiment 7, configured as described above, as illustrated in FIG. 21, cooling air A that has been bent to the radial direction through the rotation of the cooling fan 21 ramifies into cooling air A4 that enters the core end face space portion 413a along the inner circumferential surface 414 of the coil end portion 41, cooling air A1 that flows along the coil end face 411 and then is discharged outside through the air outlet 315 of the case 31, and cooling air A2 that flows along the outer circumferential surface 412 of the coil end portion 41. The cooling air A2 and the cooling air A4 enter the cooling air path 3192 and then are discharged in the radial direction at the outer circumferential surface of the stator 5. Although not illustrated, cooling air B1, cooling air B2, and cooling air B4 corresponding to the cooling air A1, the cooling air A2, and the cooling air A4 flow also in the case 32. In Embodiment 7, the flow path through which the cooling air A1, B1 flows is refereed to as a first flow path, and the flow path through which the cooling air A2, B2 flows is refereed to as a second flow path, and the flow path through which the cooling air A4, B4 flows is refereed to as a third flow path.

In the vehicle AC generator according to Embodiment 7, between the coil root portion rows 413, 423, there are formed a plurality of core end face space portions 413a, 423a that extend in the depth direction of the slot along the axis-direction end face 51, 52 of the stator core 5; therefore, the cooling air A4 that enters the core end face space portion 413a, 423a through the inner circumferential face 414, 424 of the coil end portion 41, 42 cools the inner circumferential face 414, 424 of the coil end portion 41, 42 and the coil root portion rows 413, 423. Accordingly, the cooling effect on the coil end portion can extremely be enhanced in synergy with the cooling effects of the cooling air A1, A2 On the coil end portion 41, 42.

Because, in addition to the configuration according to Embodiment 3, the core end face space portions 413a and 423a are newly formed, the number of the air paths increases; as a result, the amount of cooling air increases, whereby the cooling effect not only the coil end portions 41 and 42 but also other heat generation portions such as the stator core 5 is raised. Furthermore, the core end face space portion 413a, 423a is provided in such a way as to face the coil-end opening of the cooling air path 3192, 3292 formed in the case 31, 32; therefore, the cooling air A4 that has passed through the core end face space portion 413a, 423a is discharged to the outside of the case 31, 32, whereby the cooling effect can further be enhanced.

The through-hole cooling air paths 3192 and 3292 also have a function as a drainage hole; therefore, electrolytic corrosion and salt erosion can be prevented from being caused by water that remains in the generator.

By producing the cases 31 and 32, for example, through molding such as die-casting, additional machining for forming the cooling air paths 3192 and 3292 is not required, whereby the production cost can be reduced. Furthermore, in the case where it is required to provide an INRO-type joint in the stator core through cutting processing, the stator core is cut in a discontinuous manner along the groove of the case; therefore, machining swarf does not wind around the machining tool, whereby the lifetime of the machining tool can be extended.

The pitches, the numbers, the cross-section shapes, and the like of the cooling air paths 3192 and 3292 and air outlets 315 and 325 provided in the cases 31 and 32 are not limited to the foregoing examples. There has been explained the case where the cooling air paths 3192 and 3292 are provided in the cases 31 and 32, respectively; however, the cooling air paths may be formed in the stator core 5, or the cooling air paths may be formed in the cases 31 and 32 and the stator core 5. The cooling air paths may be provided at either one of the axis-direction end portions of the stator 6.

Embodiment 8

Figure 22:
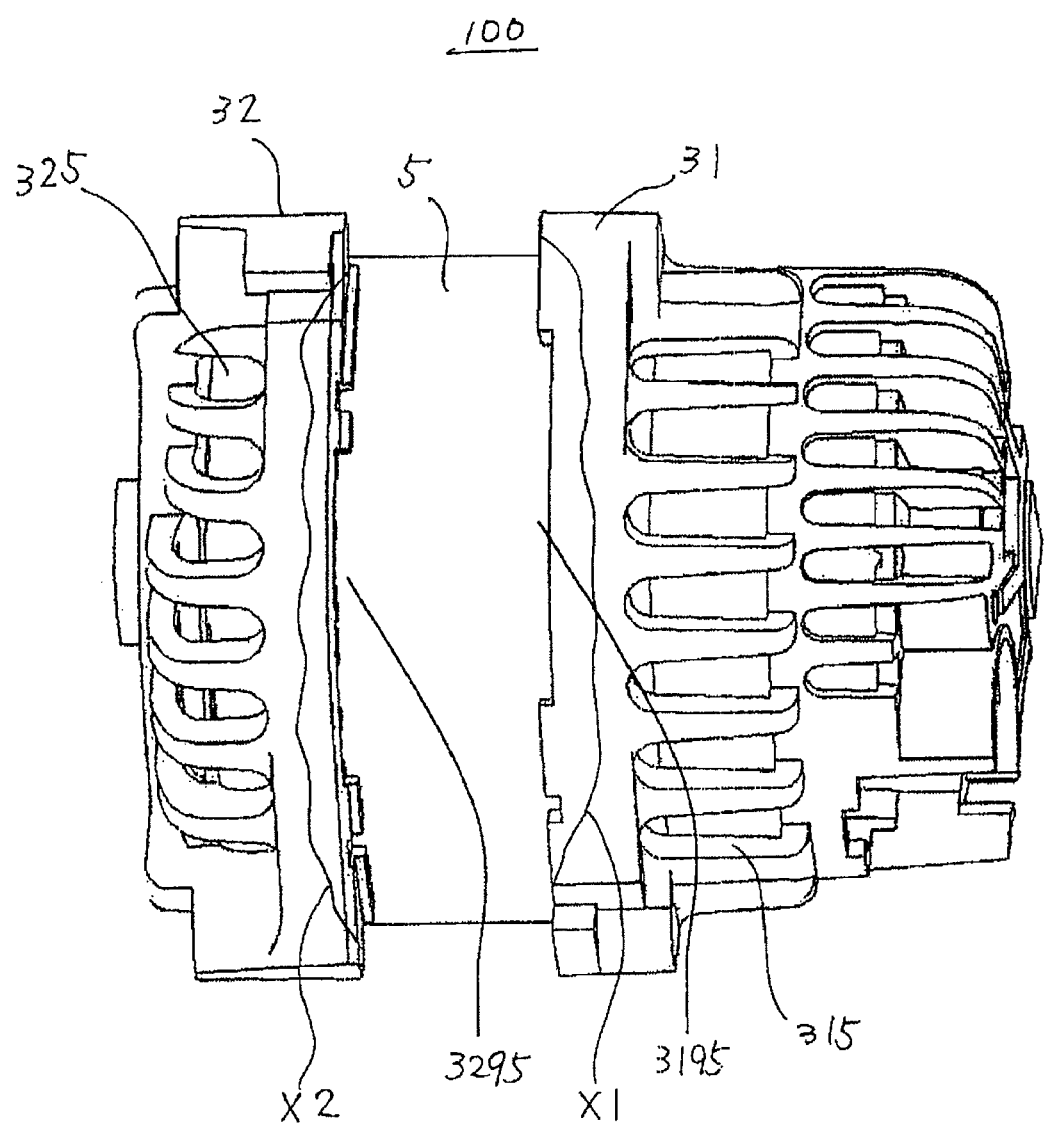
FIG. 22 is a partially broken elevation view illustrating a vehicle AC generator according to Embodiment 8 of the present invention.

FIG. 22 is an elevation view illustrating a vehicle AC generator according to Embodiment 8 of the present invention; the cases 31 and 32 are partially broken by the breaking line X1 and X2, and respective cooling air paths 3195 and 3295 are expressly illustrated. In Embodiment 8, the circumferential-direction widths of part of cooling air paths 3195 (3295) out of a plurality of cooling air paths are formed in such a way as to be larger than the circumferential-direction widths of other cooling air paths. The other configurations are the same as those in Embodiment 1.

In the vehicle AC generator according to Embodiment 8 of the present invention, the circumferential-direction width of the cooling air path at a portion where the cooling effect is particularly required to be raised is enlarged, so that the amount of cooling air at the portion is increased, whereby the cooling effect can be enhanced.

The through-hole cooling air paths 3195 and 3295 also have a function as a drainage hole; therefore, electrolytic corrosion and salt erosion can be prevented from being caused by water that remains in the generator.

By producing the cases 31 and 32, for example, through molding such as die-casting, additional machining for forming the cooling air paths 3195 and 3295 is not required, whereby the production cost can be reduced. Furthermore, in the case where it is required to provide an INRO-type joint in the stator core through cutting processing, the stator core is cut in a discontinuous manner along the groove of the case; therefore, machining swarf does not wind around the machining tool, whereby the lifetime of the machining tool can be extended.

The pitches, the numbers, the cross-section shapes, and the like of the cooling air paths and air outlets provided in the cases 31 and 32 are not limited to the foregoing examples. There has been explained the case where the cooling air paths 3195 and 3295 are provided in the cases 31 and 32, respectively; however, the cooling air paths may be formed in the stator core 5, or the cooling air paths may be formed in the cases 31 and 32 and the stator core 5. The cooling air paths may be provided at either one of the axis-direction end portions of the stator 6.

INDUSTRIAL APPLICABILITY

The present invention can be applied to an AC generator mounted in a vehicle such as an automobile.

The invention claimed is:
1. A vehicle AC generator comprising:
a stator core having a plurality of slots on the inner circumferential portion thereof;
a pair of cases, one of which is disposed at one axis-direction end portion of the stator core and the other one of which is disposed at the other axis-direction end portion and that have respective axis-direction contact faces that make contact with the corresponding axis-direction end faces of the stator core, at least one of the cases in the pair having an air inlet for taking in cooling air that enters the case and an air outlet for discharging the cooling air to the outside of the case;
a plurality of through-bolts that fix the pair of cases integrally with the stator core and extend in the axis direction of the stator core on the outer circumferential surface of the stator core;
a stator coil that is mounted in the plurality of slots and has coil end portions, one of which protrudes in the axis direction from the one axis-direction end portion of the stator core and the other one of which protrudes in the axis direction from the other axis-direction end portion;
a rotor shaft pivotably supported by the pair of cases;
a rotor that is fixed on the rotor shaft and disposed in an inner space of the stator core; and
one or more cooling fans fixed on at least, one axis-direction end portion of the rotor,
wherein at least one of the pair of cases has an air inlet for taking in cooling air to the inside of the case and an air outlet for discharging the cooling air to the outside of the case,
wherein at least one of the pair of cases is provided with the axis-direction contact face and an inner circumferential contact face that makes contact with part of the outer circumferential surface, of the stator core, that extends from the periphery of the axis-direction end face of the stator core in the axis direction of the stator core, and
wherein the axis-direction contact face has a first cooling air path that communicates with an outer circumference surface of the coil end portion, and the inner circumferential contact face has a second cooling air path that communicates with the first cooling air path and opens in the axis direction of the stator core at the outer circumferential surface of the stator core.
2. The vehicle AC generator according to claim 1,
wherein each one of the pair of cases is provided with the axis-direction contact face and an inner circumferential contact face that makes contact with part of the outer circumferential surface, of the stator core, that extends from the periphery of the axis-direction end face of the stator core in the axis direction of the stator core, wherein the axis-direction contact face has a first cooling air path that communicates with an outer circumference surface of the coil end portion, and the inner circumferential contact face has a second cooling air path that communicates with the first cooling air path and opens in the axis direction of the stator core at the outer circumferential surface of the stator core, and wherein the second cooling air path provided in the one case and the second cooling air path provided in the other case open at respective different positions in the circumferential direction of the stator core.

3. The vehicle AC generator according to claim 1, wherein the second cooling air path is provided in such a way as to be slanted in the rotation direction of the cooling fan.

4. The vehicle AC generator according to claim 1, wherein cooling air that has been discharged in the radial direction of the cooling fan flows along the axis-direction end face of the coil end portion, and then the flow path of the cooling air ramifies into a first flow path in which the cooling air is discharged to the outside of the case through the air outlet in the case and into a second flow path in which the cooling air flows along the outer circumferential surface of the coil end portion and then flows along the outer circumferential surface of the stator core through the first and second cooling air paths.

5. The vehicle AC generator according to claim 1, wherein the distance between the axis-direction end face of the stator core and a wall face, of the first cooling air path, that faces said axis-direction end face is set to be the same as or smaller than the distance between said axis direction end face of the stator core and an axis-direction wall face of the air outlet.

6. The vehicle AC generator according to claim 1, wherein the distance between the axis-direction end face of the stator core and an axis-direction wall face of the air outlet is set to be the same as or smaller than the distance between said axis-direction end face of the stator core and the axis-direction end face of the coil end portion.

7. The vehicle AC generator according to claim 1, wherein the distance between the axis-direction end face of the stator core and a wall face, of the first cooling air path, that faces said axis-direction end face is set to be the same as or larger than the distance between the outer circumferential surface of the coil end portion and the inner circumferential surface of the case.

8. The vehicle AC generator according to claim 1, wherein the stator coil is formed of a plurality of coil conductors that are arranged in the depth direction of the slot, and the plurality of coil conductors that protrude in the axis direction from the respective openings of the slots form coil root portion rows that extend in the depth direction of the slot; and between the adjacent coil root portion rows, there is formed a core end face space portion that extends in the depth direction of the slot along the axis-direction end face of the stator core.

9. The vehicle AC generator according to claim 8, wherein the core end face space portion is disposed in such a way as to face the coil-end opening of the first cooling air path.

10. The vehicle AC generator according to claim 8, wherein the flow path of cooling air that has been discharged in the radial direction of the cooling fan ramifies into a first flow path in which the cooling air flows along the axis-direction end face of the coil end portion and then is discharged from the air outlet in the case to the outside of the case, into a second flow path in which the cooling air flows along the axis-direction end face and the outer circumferential surface of the coil end portion and then is discharged to the outside of the case through the first and second cooling air paths, and into a third flow path in which the cooling air passes through the core end face space portion and then is discharged to the outside of the case through the first and second cooling air paths.

11. The vehicle AC generator according to any one of claim 1, wherein
the second cooling air path is provided at least between the adjacent through-bolts.

12. A vehicle AC generator comprising:
a stator core having a plurality of slots on the inner circumferential portion thereof;
a pair of cases, one of which is disposed at one axis-direction end portion of the stator core and the other one of which is disposed at the other axis-direction end portion and that have respective axis-direction contact faces that make contact with the corresponding axis-direction end faces of the stator core, at least one of the cases in the pair having an air inlet for taking in cooling air that enters the case and an air outlet for discharging the cooling air to the outside of the case;
a plurality of through-bolts that fix the pair of cases integrally with the stator core and extend in the axis direction of the stator core on the outer circumferential surface of the stator core;
a stator coil that is mounted in the plurality of slots and has coil end portions, one of which protrudes in the axis direction from the one axis-direction end portion of the stator core and the other one of which protrudes in the axis direction from the other axis-direction end portion;
a rotor shaft pivotably supported by the pair of cases;
a rotor that is fixed on the rotor shaft and disposed in an inner space of the stator core; and
one or more cooling fans fixed on at least one axis-direction end portion of the rotor,
wherein at least one of the pair of cases has an air inlet for taking in cooling air to the inside of the case and an air outlet for discharging the cooling air to the outside of the case,
wherein at least one of the pair of cases is provided with the axis-direction contact face and an inner circumferential contact face that makes contact with part of the outer circumferential surface, of the stator core, that extends from the periphery of the axis-direction end face of the stator core in the axis direction of the stator core, and
wherein the axis-direction contact face has a first cooling air path that communicates with an outer circumference surface of the coil end portion, and the inner circumferential contact face has a second cooling air path that communicates with the first cooling air path and opens in the radial direction of the stator core at the outer circumferential surface of the stator core.

13. The vehicle AC generator according to claim 12, wherein
the distance between the axis-direction end face of the stator core and a wall face, of the first cooling air path, that faces said axis-direction end face is set to be the same as or smaller than the distance between said axis-direction end face of the stator core and an axis-direction wall face of the air outlet.

14. The vehicle AC generator according to claim 12, wherein
the distance between the axis-direction end face of the stator core and an axis-direction wall face of the air outlet is set to be the same as or smaller than the distance between said axis-direction end face of the stator core and the axis-direction end face of the coil end portion.

15. The vehicle AC generator according to claim 12, wherein
the distance between the axis-direction end face of the stator core and a wall face, of the first cooling air path, that faces said axis-direction end face is set to be the same as or larger than the distance between the outer circumferential surface of the coil end portion and the inner circumferential surface of the case.

16. The vehicle AC generator according to claim 12, wherein
the stator coil is formed of a plurality of coil conductors that are arranged in the depth direction of the slot, and the plurality of coil conductors that protrude in the axis direction from the respective openings of the slots form coil root portion rows that extend in the depth direction of the slot; and between the adjacent coil root portion rows, there is formed a core end face space portion that extends in the depth direction of the slot along the axis-direction end face of the stator core.

17. The vehicle AC generator according to claim 16, wherein
the core end face space portion is disposed in such a way as to face the coil-end opening of the first cooling air path.

18. The vehicle AC generator according to claim 16, wherein
the flow path of cooling air that has been discharged in the radial direction of the cooling fan ramifies into a first flow path in which the cooling air flows along the axis-direction end face of the coil end portion and then is discharged from the air outlet in the case to the outside of the case, into a second flow path in which the cooling air flows along the axis-direction end face and the outer circumferential surface of the coil end portion and then is discharged to the outside of the case through the first and second cooling air paths, and into a third flow path in which the cooling air passes through the core end face space portion and then is discharged to the outside of the case through the first and second cooling air paths.

19. The vehicle AC generator according to claim 12, wherein
the second cooling air path is provided at least between the adjacent through-bolts.

* * * * *